(12) United States Patent
Kojima et al.

(10) Patent No.: US 10,295,711 B2
(45) Date of Patent: May 21, 2019

(54) PROTOTYPE ALUMINUM MOLD FOR STAMPERS AND METHOD FOR MANUFACTURING SAME, STAMPER AND METHOD FOR MANUFACTURING SAME, METHOD FOR MANUFACTURING ARTICLE, AND ANTIREFLECTION ARTICLE

(71) Applicants: Mitsubishi Rayon Co., Ltd., Tokyo (JP); Nippon Light Metal Company, Ltd., Tokyo (JP)

(72) Inventors: Katsuhiro Kojima, Yokohama (JP); Hiroshi Onomoto, Otake (JP); Hiroaki Kita, Inazawa (JP); Kota Shirai, Shizuoka (JP); Hiroshi Okada, Shizuoka (JP); Kazume Mochizuki, Shizuoka (JP)

(73) Assignees: Mitsubishi Chemical Corporation, Tokyo (JP); Nippon Light Metal Company, Ltd., Tokyo (JP)

( * ) Notice: Subject to any disclaimer, the term of this patent is extended or adjusted under 35 U.S.C. 154(b) by 924 days.

(21) Appl. No.: 14/386,447

(22) PCT Filed: Mar. 26, 2013

(86) PCT No.: PCT/JP2013/058757
§ 371 (c)(1),
(2) Date: Sep. 19, 2014

(87) PCT Pub. No.: WO2013/146771
PCT Pub. Date: Oct. 3, 2013

(65) Prior Publication Data
US 2015/0050455 A1  Feb. 19, 2015

(30) Foreign Application Priority Data
Mar. 30, 2012 (JP) .................. 2012-078812

(51) Int. Cl.
*C22F 1/00* (2006.01)
*G02B 5/02* (2006.01)
(Continued)

(52) U.S. Cl.
CPC ........... *G02B 5/0268* (2013.01); *B22D 25/02* (2013.01); *B29C 43/021* (2013.01);
(Continued)

(58) Field of Classification Search
CPC .... G02B 5/0268; B22D 25/02; B29C 43/021; B29D 11/0074; C22C 21/00; C22C 21/06
See application file for complete search history.

(56) References Cited

U.S. PATENT DOCUMENTS

| 2011/0194974 A1 | 8/2011 | Wakaguri et al. |
| 2012/0171427 A1* | 7/2012 | Kita ........................ C22C 21/06 420/542 |
| 2012/0213971 A1 | 8/2012 | Ihara |

FOREIGN PATENT DOCUMENTS

| EP | 2 476 768 A1 | 7/2012 |
| JP | 2005-156695 A | 6/2005 |

(Continued)

OTHER PUBLICATIONS

International Search Report dated May 14, 2013, issued in International Application PCT/JP2013/058757.
(Continued)

*Primary Examiner* — Joseph S Del Sole
*Assistant Examiner* — John Robitaille
(74) *Attorney, Agent, or Firm* — Fitch, Even, Tabin & Flannery LLP

(57) ABSTRACT

A prototype aluminum mold for stampers that is used to manufacture stampers having a fine irregular surface structure on the surface thereof and containing aluminum and magnesium, wherein the content of magnesium is 0.1% by
(Continued)

mass to 3% by mass, the content of silicon is 100 ppm by mass or less, the total content of elements other than aluminum and magnesium is 500 ppm by mass or less, and the number of magnesium silicide particles having an equivalent diameter of 10 nm or more on the surface of the prototype aluminum mold for stampers is 10/1000 μm² or less.

4 Claims, 4 Drawing Sheets

(51) Int. Cl.
| | |
|---|---|
| *C22C 21/00* | (2006.01) |
| *C22C 21/06* | (2006.01) |
| *C22F 1/047* | (2006.01) |
| *G02B 1/118* | (2015.01) |
| *B29D 11/00* | (2006.01) |
| *C25D 11/08* | (2006.01) |
| *C25D 11/12* | (2006.01) |
| *C25D 11/16* | (2006.01) |
| *C25D 11/24* | (2006.01) |
| *C22F 1/04* | (2006.01) |
| *B22D 25/02* | (2006.01) |
| *B29C 43/02* | (2006.01) |
| *B29C 59/04* | (2006.01) |
| *B29L 31/00* | (2006.01) |

(52) U.S. Cl.
CPC .......... *B29D 11/0074* (2013.01); *C22C 21/00* (2013.01); *C22C 21/06* (2013.01); *C22F 1/00* (2013.01); *C22F 1/04* (2013.01); *C22F 1/047* (2013.01); *C25D 11/08* (2013.01); *C25D 11/12* (2013.01); *C25D 11/16* (2013.01); *C25D 11/24* (2013.01); *G02B 1/118* (2013.01); *B29C 59/046* (2013.01); *B29L 2031/772* (2013.01); *Y10T 428/24355* (2015.01)

(56) References Cited

FOREIGN PATENT DOCUMENTS

| | | |
|---|---|---|
| JP | WO 2011030850 A1 * | 3/2011 ............ C22C 21/06 |
| JP | 2012-037670 A | 2/2012 |
| WO | 2010/128662 A1 | 11/2010 |
| WO | 2011/030850 A1 | 3/2011 |
| WO | 2011/055757 A1 | 5/2011 |

OTHER PUBLICATIONS

Chinese Office Action for Chinese Application No. 2013-80017200.1 dated Oct. 8, 2015; English translation submitted herewith (25 pages).

* cited by examiner

PROTOTYPE ALUMINUM MOLD FOR STAMPERS AND METHOD FOR MANUFACTURING SAME, STAMPER AND METHOD FOR MANUFACTURING SAME, METHOD FOR MANUFACTURING ARTICLE, AND ANTIREFLECTION ARTICLE

CROSS-REFERENCE TO RELATED APPLICATIONS

This Application is a U.S. National Stage Application filed under 35 U.S.C. § 371 of International Application PCT/JP2013/058757, filed Mar. 26, 2013, designating the United States, which claims priority from Japanese Patent Application 2012-078812, filed Mar. 30, 2012, the complete disclosures of which are hereby incorporated herein by reference in their entirety for all purposes.

TECHNICAL FIELD

The present invention relates to a prototype aluminum mold for stampers and a method for manufacturing the same, a stamper and a method for manufacturing the same, a method for manufacturing an article, and an antireflection article.

The present application claims priority on the basis of Japanese Patent Application No. 2012-078812, filed in Japan on Mar. 30, 2012, the contents of which are incorporated herein by reference.

BACKGROUND ART

Research has been conducted in recent years on reducing the amount of reflection return light of a liquid crystal screen such as that of a television or cell phone by providing an antireflective structure having a fine irregular surface structure in which the period of the irregular surface structure is controlled to be equal to or less than the wavelength of visible light.

A method in which an antireflection article (transfer article) is manufactured by forming a fine irregular surface structure by carrying out anodic oxidation treatment on the surface of a prototype aluminum mold, obtained by casting and plastic working an aluminum alloy, and transferring the irregular surface portion to a molding material such as a resin, is employed as a method for providing an antireflective structure having a fine irregular surface structure. In addition, pyramidal shapes such as a cone or quadrangular pyramid have been reported as irregular surface patterns formed by anodic oxidation treatment.

In the case of carrying out anodic oxidation treatment on the surface of a prototype aluminum mold and manufacturing a transfer article by using this surface as a mold (stamper), since the surface of the stamper is reflected directly in the transfer article, the quality of the surface thereof is important.

Examples of factors that influence the surface quality of the stamper include "second phase particles", "crystal grain size" and "crystal orientation" in the prototype aluminum mold as well as "mirror polishability" of the prototype aluminum mold material. Second phase particles are considered to have reciprocal properties with other factors (crystal grain size, crystal orientation and mirror polishability).

Furthermore, "second phase particles" refer to particles that form a phase that differs from the aluminum parent phase, and examples thereof include iron (Fe)- and silicon (Si)-based compounds present in aluminum alloy.

In general, if contaminants such as second phase particles are present on the surface of a prototype aluminum mold, discontinuous convex portions form during anodic oxidation treatment, and second phase particles slough off resulting in the formation of concave defects or defects occur on the surface of the stamper. If this stamper is used for transfer, the transfer portion corresponding to the defective portion of the stamper has discontinuous surface irregularities, transmitted light is scattered and antireflective properties of the transfer article decrease.

In this manner, the presence of second phase particles has an effect on the quality of the transfer article. In particular, in the case the circle equivalent diameter (to be referred to as "equivalent diameter") of second phase particles present on the surface of a prototype aluminum mold or stamper is larger than the wavelength of visible light, the haze value of the resulting transfer article increases considerably. In addition, even in the case the equivalent diameter of second phase particles is smaller than the wavelength of visible light, if a large number of second phase particles are present, the haze value of the transfer article also ends up increasing.

Consequently, the number of second phase particles in an aluminum die that can become defects on the surface of a stamper is preferably as low as possible. In order to decrease the number of second phase particles, high purity aluminum is used that contains low levels of additional elements and impurities that give rise to second phase particles, and a stamper has been proposed that uses pure aluminum having purity of, for example, 99.99% (see, for example, Patent Document 1).

However, crystal grains of high purity aluminum easily become coarse in the casting step, plastic working step and heat treatment (annealing) step. Since macroscopically conspicuous coarse crystal grains form similar grain boundary patterns in oxide films as well and these patterns are also transferred to the transfer article by the stamper, the appearance of the transfer article is impaired.

Therefore, although a cast structure can be refined by adding a refining agent (such as an aluminum-titanium-boron-based (Al—Ti—Bo-based alloy)) to the molten metal immediately before casting, in the case of high purity aluminum, this refining becomes difficult and the amount of refining agent added tends to increase. As a result, second phase particles attributable to additives (such as titanium diboride ($TiB_2$)) increase and surface quality of the stamper is impaired.

A prototype aluminum mold for stampers has been proposed for use as a prototype aluminum mold for solving these problems that inhibits the appearance (deposition) of second phase particles by having fine, uniformly oriented crystal grains in conjunction with reducing the content of impurities as much as possible by limiting the content of magnesium (Mg) contained in the aluminum molten metal to 0.5% by mass to 3% by mass and limiting the content of elements other than Mg, including impurities, to 500 ppm or less (see, for example, Patent Document 2). According to Patent Document 2, an irregular transfer surface having a non-directional, uniform pattern can be formed by carrying out anodic oxidation treatment on this prototype aluminum mold for stampers.

PRIOR ART DOCUMENTS

Patent Documents

Patent Document 1: Japanese Unexamined Patent Application, First Publication No. 2005-156695
Patent Document 2: International Publication No. WO 2011/030850

DISCLOSURE OF THE INVENTION

Problems to be Solved by the Invention

However, although a prototype aluminum mold containing Mg as described in Patent Document 2 has fine, non-directional crystal grains, when a transfer article obtained by transferring the surface structure of a stamper fabricated by carrying out anodic oxidation treatment on this prototype aluminum mold was observed in detail, numerous fine convex defects D were determined to be present as shown in FIG. 6, for example. Furthermore, convex defects D of a transfer article may also be referred to as confetti-like defects based on their shape.

Although the majority of convex defects of the transfer article are smaller than the wavelength of visible light, if a large number are present in the manner described above, diffuse reflection occurs on the surface of the transfer article bringing about an increase in haze thereof. In addition, there are also cases in which resin becomes embedded in concave defects in the stamper surface, which are inverted structures of convex defects of the transfer article, during transfer to a resin and the like, thereby causing the problem of the transfer article adhering to the stamper and becoming difficult to peel off and preventing continuous transfer. Consequently, it is necessary to reduce the occurrence of convex defects and the like of transfer articles as much as possible.

In consideration of the aforementioned circumstances, the present invention provides a method for manufacturing a prototype aluminum mold for stampers that allows the obtaining of a stamper capable of manufacturing transfer articles having few convex defects. In addition, an object of the present invention is to provide a stamper capable of manufacturing transfer articles having few convex defects and a method for manufacturing the same. Moreover, the present invention provides a method for manufacturing an article having few convex defects. In addition, the present invention provides an antireflection article having few convex defects.

Means for Solving the Problems

As a result of conducting extensive studies, the inventors of the present invention determined that, in the case of a prototype aluminum mold containing Mg, magnesium silicide ($Mg_2Si$) in particular, which is formed in second phase particles by bonding between Mg and Si, is the major cause of convex defects (confetti-like defects) in transfer articles. Although Mg easily forms a solid solution, it forms second phase particles with Si and other elements at a specific concentration and temperature range. Therefore, it was found that a stamper capable of manufacturing transfer articles having few convex defects can be obtained by regulating the content of Si and other metals that form second phase particles by bonding with Mg and further regulating the number of $Mg_2Si$ particles on the surface of the prototype aluminum mold, thereby leading to completion of the present invention.

The present invention has the characteristics indicated below.

<1> A prototype aluminum mold for stampers containing aluminum and magnesium that is used in the manufacturing of stampers having a fine irregular surface structure on the surface thereof; wherein, the content of magnesium is 0.1% by mass to 3% by mass, the content of silicon is 100 ppm by mass or less, the total content of elements other than aluminum and magnesium is 500 ppm by mass or less, and the number of magnesium silicide particles having an equivalent diameter of 10 nm or more on the surface of the prototype aluminum mold for stampers is $10/1000\ \mu m^2$ or less.

<2> The prototype aluminum mold for stampers described in <1>, wherein the number of magnesium silicide particles having an equivalent diameter of 10 nm or more is $8/1000\ \mu m^2$ or less.

<3> A method for manufacturing a stamper that includes forming a fine irregular surface structure by carrying out anodic oxidation treatment on the prototype aluminum mold for stampers described in <1> or <2>.

<4> A method for manufacturing an article that includes transferring a fine irregular surface structure formed on the surface of a stamper to the surface of an article body using the stamper manufactured according to the method for manufacturing a stamper described in <3> or the following <10> or using the stamper described in the following <11>.

<5> A method for manufacturing a prototype aluminum mold for stampers that is used in the manufacturing of stampers having a fine irregular surface structure on the surface thereof, which includes a casting step for casting an aluminum alloy in which the content of magnesium if 0.1% by mass to 3% by mass, the content of silicon is 100 ppm by mass or less, and the total content of elements other than aluminum and magnesium is 500 ppm by mass or less, a plastic working step for subjecting the cast aluminum alloy to plastic working, a heat treatment step for heat-treating the plastic-worked aluminum alloy at 400° C. or higher, and a cooling step for cooling the heat-treated aluminum alloy at a cooling rate of 100° C. per hour or more over a temperature range of 300° C. to 400° C.

<6> The method for manufacturing a prototype aluminum mold for stampers described in <5>, wherein in the heat treatment step, the plastic-worked aluminum alloy is heat-treated at 600° C. or lower.

<7> The method for manufacturing a prototype aluminum mold for stampers described in <5> or <6>, wherein in the cooling step, the heat-treated aluminum alloy is cooled at a cooling rate of 300° C. per hour or more over a temperature range of 300° C. to 400° C.

<8> The method for manufacturing a prototype aluminum mold for stampers described in any of <5> to <7>, wherein the casting step is carried out by adding 5 ppm by mass to 150 ppm by mass of titanium and 1 ppm by mass to 30 ppm by mass of one of at least boron and carbon to the aluminum alloy.

<9> The method for manufacturing a prototype aluminum mold for stampers described in any of <5> to <8>, wherein the plastic working step is a step in which the average crystal grain size of the cast aluminum alloy is made to be 100 μm or less by subjecting to forging treatment.

<10> A method for manufacturing a stamper that includes forming a fine irregular surface structure by carrying out anodic oxidation treatment on a prototype aluminum mold for stampers manufactured according to the method for manufacturing a prototype aluminum mold for stampers described in any of <5> to <9>.

<11> A stamper used in the manufacturing of articles having a fine irregular surface structure on the surface thereof, wherein the stamper has a prototype aluminum mold and a fine irregular surface structure formed on the surface of the prototype aluminum mold in which the average interval between pores is equal to or less than the wavelength of visible light, the content of magnesium in the prototype aluminum mold is 0.1% by mass to 3% by mass, the content of silicon is 100 ppm by mass or less, the total content of elements other than aluminum and magnesium is 500 ppm by mass or less, and the number of magnesium silicide particles having an equivalent diameter of 10 nm or more on the surface of the stamper is 10/1000 μm² or less.

<12> An antireflection article having a transparent base material and a fine irregular surface structure formed on the transparent base material composed of a plurality of projections having an average interval that is equal to or less than the wavelength of visible light, wherein the number of convex defects having an equivalent diameter of 500 nm or more on the surface of the fine irregular surface structure is 20/1000 μm² or less.

<13> The antireflection article described in <12>, wherein the number of convex defects is 10/1000 μm² or less.

<14> The antireflection article described in <12> or <13>, wherein the haze value thereof is 0.5% or less.

Effects of the Invention

According to the prototype aluminum mold for stampers of the present invention, a stamper can be obtained that is capable of manufacturing transfer articles having few convex defects.

In addition, according to the method for manufacturing a prototype aluminum mold for stampers of the present invention, a prototype aluminum mold for stampers can be obtained that allows the obtaining of a stamper that is capable of manufacturing transfer articles having few convex defects.

In addition, according to the method for manufacturing a stamper of the present invention, a stamper can be obtained that is capable of manufacturing transfer articles having few convex defects.

In addition, according to the stamper of the present invention, a transfer article can be manufactured that has few convex defects.

In addition, according to the method for manufacturing an article of the present invention, an article can be obtained that has few convex defects.

In addition, the antireflection article of the present invention has few convex defects.

BEST MODE FOR CARRYING OUT THE INVENTION

Figure 1:
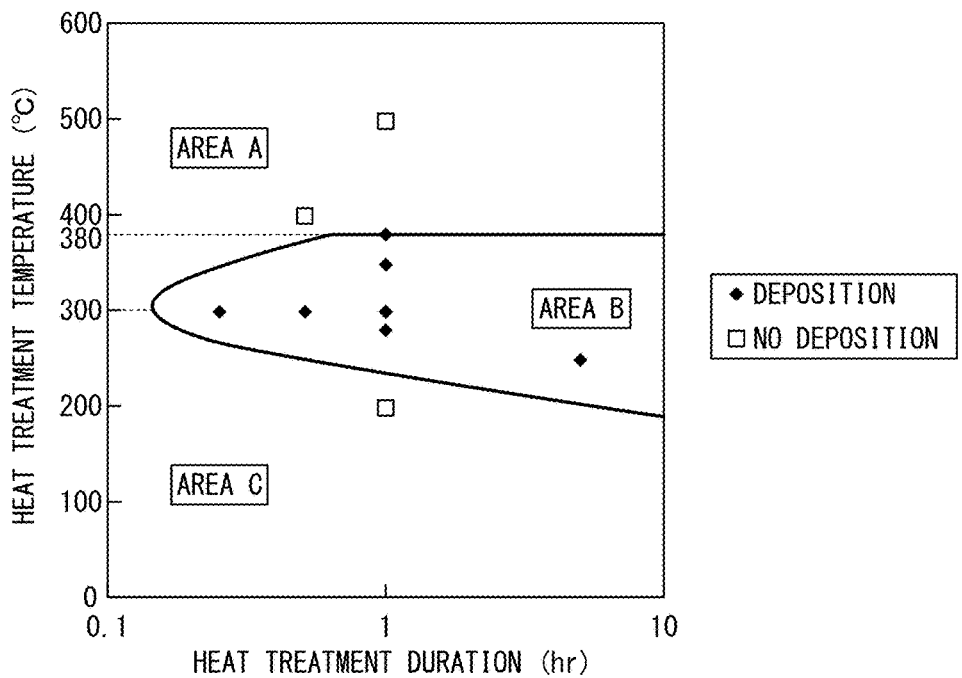
FIG. 1 is a correlation diagram showing the relationship between heat treatment conditions and deposition of Mg₂Si.

In the present description, a "prototype aluminum mold material" refers to an aluminum alloy after having undergone a casting step but before undergoing a plastic working step, while a "prototype aluminum mold" refers to an aluminum alloy after having undergone a plastic working step and immediately before undergoing machining and the like and subjecting to anodic oxidation treatment.

In addition, a "pore" refers to a concave portion of a fine irregular surface structure formed in an oxide film on the surface of a prototype aluminum mold for stampers.

In addition, a "fine irregular surface structure" refers to a structure in which the average interval between concave portions or convex portions is on the nanometer scale.

In addition, "(meth)acrylate" is the generic term for acrylate and methacrylate.

In addition, an "active energy beam" refers to visible light, ultraviolet light, an electron beam, plasma beam or heat rays (such as infrared light) and the like.

[Prototype Aluminum Mold for Stampers]

The prototype aluminum mold for stampers of the present invention (hereinafter to simply be referred to as the "prototype aluminum mold") is a mold used to manufacture a stamper having a fine irregular surface structure on the surface thereof, and is composed of an aluminum material containing aluminum (Al) and magnesium (Mg). In addition, the prototype aluminum mold may also contain elements other than Al and Mg.

In the prototype aluminum mold of the present invention, the content of Mg is 0.1% by mass to 3% by mass, the content of silicon (Si) is 100 ppm by mass or less, the total content of elements other than Al and Mg is 500 ppm by mass or less, and the remainder is Al.

Mg easily forms second phase particles (Al—Mg-based compounds such as Al₃Mg₂) by bonding with Al over a temperature range of 66° C. to 180° C.

In the process for manufacturing a prototype aluminum mold, although hot forging and heat treatment steps (annealing) in particular are carried out at the recrystallization temperature (300° C.) or higher, since the aluminum material is exposed to a temperature range of 66° C. to 180° C. during the heating and cooling processes thereof, albeit although only for a short period of time, second phase particles (such as Al₃Mg₂) end up being easily formed at this time.

In addition, since the prototype aluminum mold contains Mg, it also has an effect on usage conditions of the stamper. For example, in the case of a stamper having reached the end of its service life due to deterioration of the oxide film, the stamper can be regenerated by removing the oxide film on the stamper surface by machining and repeating anodic oxidation treatment. However, in the case temperature at which the stamper is used is 66° C. to 180° C., second phase particles (such as Al₃Mg₂) are easily formed near the stamper surface, thereby making it difficult to regenerate the stamper and leading to increased costs. Alternatively, if the stamper is to be regenerated, the temperature at which the stamper is used ends up being limited to a temperature outside the range of 66° C. to 180° C.

Consequently, the content of Mg in the prototype aluminum mold is made to be 3% by mass or less. If the content of Mg exceeds 3% by mass, the rate at which the Mg bonds with Al and forms second phase particles (such as Al₃Mg₂) over a temperature range of 66° C. to 180° C. increases, and the second phase particles slough off during anodic oxidation treatment resulting in the formation of concave defects in the stamper surface. In particular, the content of Mg is preferably 2% by mass or less in order to suppress deformation resistance attributable to solute strengthening of Mg and reduce costs incurred during a plastic working step to be subsequently described.

However, if the concentration of Mg is excessively low, the required amount of refining agent added to granulate the crystal grains in a casting step to be subsequently described becomes extremely large, and ends up having a detrimental effect due to second phase particles contained therein. The content of Mg that allows granulation with a suitable amount of refining agent is 0.1% by mass or more.

Furthermore, even if granulation is carried out by the addition of Mg and a refining agent, since a larger amount of Mg results in a finer cast structure, in cases requiring fine crystal grains, the content of Mg is preferably 0.5% by mass or more.

In addition, although it is possible to consider allowing the content of Mg to be less than 0.1% by mass and instead increasing the degree of processing by forging in the plastic working step to be subsequently described to increase accumulation of strain serving as the driving force of recrystallization and increase the fineness of the crystal grains, this leads to an increase in forging costs.

The content of Si is 100 ppm by mass or less. If the content of Si exceeds 100 ppm by mass, magnesium silicide ($Mg_2Si$) is easily formed by bonding with Mg. In addition, when a heat treatment step to be subsequently described is carried out, it becomes difficult for Si to form a solid solution due to the conditions of heat treatment, and there are cases in which this leads to the formation of $Mg_2Si$.

However, there elements (such as iron (Fe) or manganese (Mn)) present in Al that cause the formation of second phase particles even if present alone without going into solid solution, as well as elements (such as copper (Cu)) that, despite going into solid solution at high temperatures, are present in the form of second phase particles at room temperature. These elements are the cause of convex defects in transfer articles if present as second phase particles.

If the total content of elements other than Al and Mg present in a prototype aluminum mold is 500 ppm by mass or less, the rate at which these elements are present as second phase particles can be decreased, thereby allowing the obtaining of a stamper in which concave defects have been inhibited.

In addition, titanium (Ti) at 5 ppm by mass to 150 ppm by mass and at least one of boron (B) and carbon (C) at 1 ppm by mass to 30 ppm by mass are preferably added to the prototype aluminum mold of the present invention. Ti, B and C are added as refining agents in the form of Al—Ti—B-based master alloy or Al—Ti—C-based master alloy that facilitate refinement of the cast structure. Furthermore, the addition of Ti at 5 ppm by mass to 150 ppm by mass and the addition of at least one of B and C at 1 ppm by mass to 30 ppm by mass refer to the addition of refining agent in an amount such that the increase in the content of Ti in the prototype aluminum mold is 5 ppm by mass to 150 ppm by mass in comparison with that prior to addition and the increase in the content of one of at least B and C is 1 ppm by mass to 30 ppm by mass in comparison with prior to addition.

If the increase in the content of Ti in the prototype aluminum mold is less than 5 ppm by mass in comparison with prior to addition or the increase in the content of at least one of B and C is less than 1 ppm by mass in comparison with prior to addition, refining effects as a refining agent are unable to be adequately obtained. On the other hand, if the increase in the content of Ti exceeds 150 ppm by mass in comparison with prior to addition or the increase in the content of at least one of B and C exceeds 30 ppm by mass in comparison with prior to addition, second phase particles such as titanium diboride ($TiB_2$) or titanium carbide (TiC) are formed easily. In particular, if the increase in the content of Ti is 30 ppm by mass or less in comparison with prior to addition and the increase in the content of at least one of B and C is 6 ppm by mass or less in comparison with prior to addition, the formation of second phase particles such as $TiB_2$ or TiC can be inhibited more effectively.

However, in the case of adding Ti, B and C, the total content of elements other than Al and Mg, including Ti, B, C and Si, is made to be 500 ppm by mass or less.

As has been previously described, one possible cause of concave defects in the stamper surface is the sloughing off of second phase particles in the prototype aluminum mold during anodic oxidation treatment. In the case of prototype aluminum molds containing Mg in particular, $Mg_2Si$ presents the greatest problem among these second phase particles.

The majority of $Mg_2Si$ particles have an equivalent diameter of 10 nm to 250 nm, which is equal to or less than the wavelength of visible light. However, if a large number of $Mg_2Si$ particles are present, the presence of these particles leads to convex defects in a transfer article in the same manner as the presence of particles that are larger than the wavelength of visible light, thereby causing an increase in haze. In addition, corrosion occurs between the $Mg_2Si$ particles and aluminum, and in the case comparatively large concave portions are formed and the $Mg_2Si$ particles end up sloughing off, even if the size per se of the $Mg_2Si$ particles is small, there are cases in which defects formed in the stamper or transfer articles become comparatively large.

Figure 6:
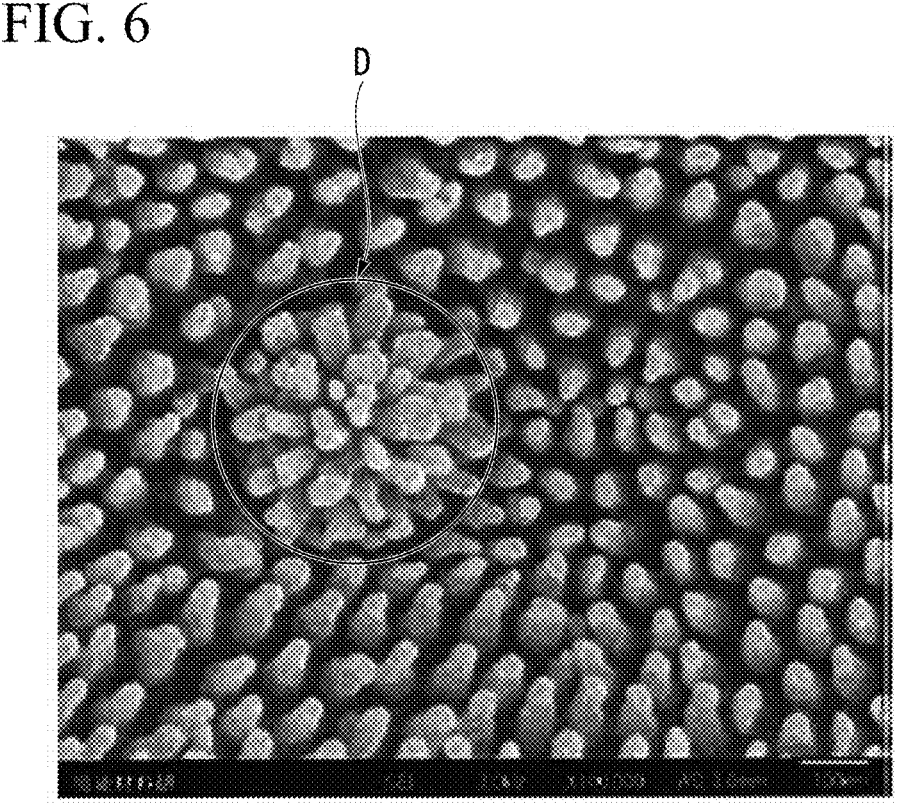
FIG. 6 is an electron micrograph of a transfer article in which convex defects (confetti-like defects) are formed on the surface thereof.

Furthermore, convex defects refer to confetti-like projections having an equivalent diameter of 500 nm or more as shown in FIG. 6.

Consequently, the number of $Mg_2Si$ particles having an equivalent diameter of 10 nm or more on the surface of the prototype aluminum mold of the present invention is $10/1000 \mu m^2$ or less. If the number of $Mg_2Si$ particles having an equivalent diameter of 10 nm or more on the surface of the prototype aluminum mold exceeds $10/1000 \mu m^2$, a large number of convex defects are formed on the surface of a transfer article obtained by transferring the surface structure of a stamper obtained from the prototype aluminum mold of the present invention and haze increases. The aforementioned number of $Mg_2Si$ particles is preferably $8/1000 \mu m^2$ or less. In addition, the haze value of the transfer article is preferably 0.5% or less and more preferably 0.3% or less.

Furthermore, equivalent diameter in the present invention refers to the diameter of a circle having the same area as the projected area of a particle.

<Action and Effects>

Since the prototype aluminum mold of the present invention as explained above has an Mg content of 0.1% by mass to 3% by mass, an Si content of 100 ppm by mass or less and the total content of elements other than Al and Mg is 500 ppm by mass or less, the formation of second phase particles that cause concave defects in the stamper surface can be inhibited. In addition, since the number of $Mg_2Si$ particles, which present a particular problem among second phase particles, is $10/1000 \mu m^2$ or less, use of the prototype aluminum mold of the present invention makes it possible to manufacture a stamper in which concave defects are inhibited.

[Method for Manufacturing Prototype Aluminum Mold for Stampers]

Prototype aluminum molds are normally manufactured by going through a casting step and a plastic working step.

In order to make the number of $Mg_2Si$ particles having an equivalent diameter of 10 nm or more present on the surface of the prototype aluminum mold 10/1000 $\mu m^2$ or less, a heat treatment step and cooling step are carried out under specific conditions following a plastic working step, or the content of Si in the prototype aluminum mold material is reduced.

The following provides a detailed explanation of one embodiment of the method for manufacturing a prototype aluminum mold.

The method for manufacturing a prototype aluminum mold of the present embodiment has a casting step for casting an aluminum alloy serving as the raw material of the prototype aluminum mold, a plastic working step for plastic-working the cast aluminum alloy, a heat treatment step for heat treating the plastic-worked aluminum alloy, a cooling step for cooling the heat-treated aluminum alloy, and a machining step for machining the cooled aluminum alloy to a desired shape.

(Casting Step)

The casting step is a step for casting the aluminum alloy. There are no particular limitations on the conditions of the casting step.

An ingot in which the content of Mg is 0.1% by mass to 3% by mass, the content of Si is 100 ppm by mass or less, the total content of elements other than Al and Mg is 500 ppm by mass or less and the remainder is Al is used for the aluminum alloy.

However, the cast structure of high purity aluminum is coarse and the average crystal grain size is on the centimeter order. Since vestiges of coarse ingot crystal grains easily remain large even after the plastic working step or heat treatment step to be subsequently described, it is preferable to refine the ingot crystal grains.

Consequently, in order to refine the ingot, a refining agent such as an Al—Ti—B-based master alloy or Al—Ti—C-based master alloy is typically added to the molten metal immediately prior to casting to increase the number of crystal grains formed using $TiB_2$ particles or TiC particles as nuclei thereof. At this time, Ti, B and C initially contained in the ingot end up aggregating and have hardly any refining ability.

In the case of high purity aluminum having purity of 99.95% or more, refining is difficult by adding the usual amount of refining agent (added amount such that the increase in the content of Ti is 5 ppm by mass to 100 ppm by mass in comparison with prior to addition and the increase in the content of B is 1 ppm by mass to 20 ppm by mass in comparison with prior to addition, or the increase in the content of Ti is 5 ppm by mass to 250 ppm by mass in comparison with prior to addition and the increase in the content of C is 1 ppm by mass to 50 ppm by mass in comparison with prior to addition), and even if refining agent is added in an amount such that the increase in the content of Ti is 350 ppm by mass and the increase in the content of at least one of B and C is 70 ppm by mass, refinement is adequate. Therefore, although it is necessary to increase the amount of refining agent added in order to realize adequate refinement, an increase in the amount of refining agent added leads to an increase in second phase particles ($TiB_2$ and TiC), and this causes concave defects on the stamper surface.

However, although the prototype aluminum mold used in the present invention uses high purity aluminum as the raw material thereof, purity decreases since Mg is added thereto. Consequently, average crystal grain size can be reduced to about 200 $\mu m$ to 500 $\mu m$ by adding an amount of refining agent such that the increase in the content of Ti is 5 ppm by mass to 150 ppm by mass in comparison with prior to addition and the increase in the content of one of at least B and C is 1 ppm by mass to 30 ppm by mass in comparison with prior to addition. In particular, adequate refinement can be realized even if only a small amount of refining agent is added such that the increase in the content of Ti is 8 ppm by mass and the increase in the content of at least one of B and C is about 2 ppm by mass.

(Plastic Working Step)

The plastic working step is a step for plastic-working the cast aluminum alloy.

Although any non-uniformity attributable to crystal orientation can be reduced by refining the cast structure in the casting step, the average crystal grain size is still about 200 $\mu m$ to 500 $\mu m$. In cases in which further refining is necessary, the cast structure is preferably refined to a degree that is no longer macroscopically conspicuous (and more specifically, to an average crystal grain size of 100 $\mu m$ or less). Therefore, in order to further refine the structure, plastic working is carried out on the cast aluminum alloy (prototype aluminum mold material). Furthermore, in cases in which further refinement of crystal grains is not required, refinement of crystal grains by plastic working need not be carried out.

A processing method that imparts a greater degree of processing to the prototype aluminum mold material is employed for the plastic working method, and examples thereof include rolling treatment, extrusion treatment and forging treatment. However, in the case of rolling treatment and extrusion treatment, since the processing direction is limited to one direction, a processed structure is formed in which the crystal grains of the ingot extend in the processing direction, vestiges of the processed structure also remain in the processing direction following recrystallization by heat treatment to be subsequently described, and there are cases in which striated non-uniform structures end up being formed. If a stamper is manufactured using a prototype aluminum mold having such non-uniform structures, the non-uniform structures appear as macroscopic patterns, and non-uniform macroscopic patterns end up occurring on the transfer surface formed from that stamper. Consequently, two or more processing directions are preferable.

In the case of forging treatment, since the processing direction can be changed as desired, forging treatment is advantageous in terms of creating a random structure that demonstrates little anisotropy, thereby making this preferable for use as the method for plastic working.

In addition, since the processing direction is limited in the case of rolling treatment and extrusion treatment, the degree of processing ends up being determined by the dimensions of the prototype aluminum mold material before plastic working and the dimensions after processing.

On the other hand, since plastic working can be repeatedly applied by interchanging the processing direction in the case of forging treatment, a larger degree of processing can be obtained. A larger degree of processing leads to accumulation of strain that serves as the driving force of recrystallization, and this accumulation of strain acts to further refine the recrystallized structure and contribute to uniformity of a transfer article obtained by using an oxide film as a cast. Accordingly, forging treatment is preferable when desiring to obtain finer crystal grains.

The following provides a detailed explanation of forging treatment.

Forging treatment is broadly classified into hot forging, which is mainly carried out for the purpose of refining the prototype aluminum mold material by destroying a comparatively coarse cast structure, and cold forging, which is mainly carried out for the purpose of further refining the prototype aluminum mold material that has already been refined by hot forging.

Furthermore, in cases when refinement of crystal grains of the prototype aluminum mold is required, forging treatment is preferably carried out in the manner described above to make the average crystal grain size to be 100 μm or less. Furthermore, in cases in which the required level of crystal grain refinement is not that high, it is sufficient to make the average crystal grain size to be 500 μm or less, and in such cases, rolling treatment or extrusion treatment and the like may be used instead of forging treatment for the plastic working method.

In addition, prior to the plastic working step, the aluminum alloy may be made to be homogeneous (homogeneous treatment) by heat-treating the cast aluminum alloy at 420° C. to 630° C. and then cooling at 100° C. per hour or more. As a result of this homogeneous treatment, impurities (such as Si) in the aluminum alloy with the exception of Al and Mg can be melted into the Al.

Hot Forging:

The prototype aluminum mold material is preferably preheated prior to subjecting to hot forging. If the preheating temperature is excessively low, it is difficult for recrystallization to occur during hot forging and the prototype aluminum mold material is less likely to be uniform, while if the preheating temperature is excessively high, grain growth during preheating becomes remarkable, coarse crystal grains form and vestiges thereof end up remaining even after cold forging. The preheating temperature is preferably 350° C. to 470° C. and more preferably as close to 420° C. as possible.

Preheating is normally carried out for about several hours.

Next, a forged material is obtained by free-forging the preheated prototype aluminum mold material.

Hot forging is basically carried out for 3 cycles with one cycle consisting of (2/3U–1.5S), and in cases requiring a higher degree of refinement, hot forging is repeated under the same conditions after repeating preheating. Here, the terms "2/3U" and "1.5S" are defined in JIS G 0701, with "2/3U" indicating upset forging at a forging ratio of 2/3, and "1.5S" indicating solid forging at a forging ratio of 1.5.

There are no restrictions on the order of upset forging and solid forging, and the order thereof may be reversed.

Although a larger number of hot forging cycles allow a uniform structure to be easily obtained, the decrease in temperature of the forged material becomes larger as forging time increases. If the temperature of the forged material falls below 300° C. due to this decrease in temperature, it becomes difficult for recrystallization to occur and in turn becomes difficult to achieve the primary objective of hot forging, namely to obtain a uniform structure. Consequently, it is necessary to raise the preheating temperature. However, if the preheating temperature is raised, there is increased likelihood of the occurrence of increases in crystal grain size during this preheating. Consequently, the number of hot forging cycles is preferably limited to about three cycles. Although the number of hot forging cycles can be decreased and the temperature decrease during hot forging can be inhibited, thereby making it possible to lower the preheating temperature, in this case, the decrease in the number of cycles in order to obtain a uniform structure is compensated for by increasing the number of times hot forging and reheating are carried out, thereby making this industrially unrealistic.

In addition, if the amount of extend forging and amount of upset forging are increased all at once in the manner of three cycles of (2S–1/2U), accumulation of strain increases for the same number of cycles, which is advantageous in terms of refining crystal grains. However, there is greater likelihood of wrinkles in the surface being incorporated during forging and these wrinkles appearing in the form of defects during subsequent anodic oxidation treatment, thereby making this undesirable. In addition, recrystallization can also be considered by repeating cold forging and heat treatment instead of recrystallizing by hot forging.

Furthermore, in cases requiring high uniformity, this hot forging can be omitted thereby making it possible to reduce forging cost provided the average crystal grain size during forging is reduced to about 200 μm to 500 μm.

However, in the case of having carried out preheating for several hours at a preheating temperature of, for example, 300° C. to 380° C., although the details will be subsequently described, deposition of $Mg_2Si$ is thought to occur as a result of constituting the same conditions as area B shown in FIG. 1.

However, investigation of the aluminum alloy after having carried out hot forging and cold forging revealed that $Mg_2Si$ had not been deposited. Since it is thought that it is difficult to change deposition status after hot forging and after cold forging, the temperature during hot forging (and particularly preheating) is thought to not have a significant effect on deposition of $Mg_2Si$.

The reason for it being difficult for deposition to occur during hot forging is that there is little accumulation of strain which makes it difficult for Si to disperse. In addition, deposition of $Mg_2Si$ also does not occur even in the case of having carried out rolling treatment or extrusion treatment at a similar temperature.

Cold Forging:

Cold forging is carried out mainly for the purpose of accumulating strain in order to refine recrystallized grains, and is advantageous for refining in the case of a higher forging ratio. However, since cracking occurs during forging in the case the forging ratio is excessively high, cold forging is preferably carried out for 2 to 3 cycles in the case of one cycle consisting of (1.5S–2/3U). In addition, the temperature of the forged material rises due to processing heat during cold forging. In the case of exceeding 200° C. at which the release of strain becomes remarkable, cooling is preferably carried out by water cooling or air cooling and the like, and the temperature is more preferably maintained at 150° C. or lower.

(Heat Treatment Step)

The heat treatment step is a step for heat-treating (annealing) the plastic-worked aluminum alloy.

The heat treatment step after the plastic working step is carried out to induce recrystallization by using as the driving force thereof strain accumulated during cold forging and other plastic working.

In the case of focusing on crystal grain structure, recrystallization does not occur and the processed structure ends up remaining if the heat treatment temperature (annealing temperature) is excessively low. In addition, grain growth ends up occurring resulting in the formation of coarse crystal grains if the heat treatment temperature is excessively high.

On the other hand, as a result of the inventors of the present invention focusing on the relationship between heat treatment conditions and deposition of $Mg_2Si$, $Mg_2Si$ was determined to end up being deposited when heat treatment is carried out over a temperature range of above 300° C. and below 400° C. as shown in FIG. 1.

FIG. 1 is a correlation diagram showing the relationship between heat treatment conditions and deposition of $Mg_2Si$, and was prepared in the manner described below.

First, after having cast an aluminum alloy having an Mg content of 1.04% by mass and Si content of 20 ppm by mass, plastic working in the form of hot forging and cold forging were carried out to obtain a sample material. Furthermore, there was no deposition of $Mg_2Si$ in the aluminum alloy following cold forging.

Next, the sample material was subjected to heat treatment under various heat treatment conditions (heat treatment temperature and heat treatment duration). Samples for observation with a transmission electron microscope (TEM) were prepared from the sample material after heat-treating under each of the heat treatment conditions, the presence or absence of deposition of $Mg_2Si$ was observed by observing with the TEM, and the relationship between heat treatment conditions and deposition of $Mg_2Si$ was plotted in FIG. 1.

Furthermore, provided the content of Si is the same, a trend identical to the results shown in FIG. 1 is demonstrated regardless of the content of Mg. In particular, the same results as those shown in FIG. 1 are thought to be obtained provided the content of Mg is within the range of 0.1% by mass to 3% by mass.

As shown in FIG. 1, heat treatment conditions (heat treatment temperature and heat treatment duration) are broadly divided into three areas. Since deposition of $Mg_2Si$ occurs in area B, if heat treatment is carried out under the conditions of area A or area C, a prototype aluminum mold is obtained in which deposition of $Mg_2Si$ is inhibited. However, although $Mg_2Si$ was not observed in this investigation under the conditions of area C, there is the possibility of deposition of fine $Mg_2Si$ that is unable to be observed during hot forging or heat treatment. Consequently, rather than the case of heat treating at 300° C. or lower, the case of heat treating at 400° C. or higher and allowing the Si to melt into the Al matrix is more effective for preventing deposition of $Mg_2Si$, thereby making this more preferable.

The reason why deposition of $Mg_2Si$ does not occur in area A is that, due to the high heat treatment temperature, enough energy is imparted for the Al in the Al matrix to be substituted with Si, thereby enabling Si to melt into the Al and making it difficult for Si to bond with Mg.

In addition, the reason for deposition of $Mg_2Si$ not occurring in area C is that, since it is difficult for Si to disperse resulting in the Si migrating over a shorter distance during heat treatment, it is difficult for the Si to bond with Mg.

The reason for $Mg_2Si$ ending up being deposited when heat treatment is carried out over a temperature range of above 300° C. and below 400° C. is that, this temperature range constitutes a temperature that is sufficient for allowing impurities in the form of Si to disperse, while also being insufficient for allowing $Mg_2Si$ to form a solid solution. In other words, at a temperature of 300° C. or lower as previously described (area C in FIG. 1), Si has difficulty in dispersing thereby making it difficult for $Mg_2Si$ to be deposited. In addition, at a temperature of 400° C. or higher (area A in FIG. 1), since sufficient energy is imparted for allowing Al in the Al matrix to be substituted with Si, Si melts into the Al matrix. As a result, it is difficult for Si to bond with Mg thereby making it difficult for deposition of $Mg_2Si$ to occur.

In this manner, since deposition of $Mg_2Si$ and crystal grain structure have reciprocal properties, it is necessary to prioritize one or the other corresponding to the required characteristics of the final application.

In the present embodiment, the heat treatment temperature is made to be 300° C. or lower or 400° C. or higher in order to inhibit deposition of $Mg_2Si$. In the case of carrying out heat treatment at 300° C. or lower, the heat treatment temperature is preferably below 300° C., more preferably 280° C. or lower and particularly preferably 250° C. or lower. On the other hand, in the case of carrying out heat treatment at 400° C. or higher, although crystal grains tend to become larger as the heat treatment temperature becomes higher, in the case of applications not requiring crystal refinement, there are no problems with raising the heat treatment temperature.

In the case of using a prototype aluminum mold as a mold of a stamper for manufacturing an antireflection article in particular, since there is the risk of an increase in haze of the antireflection article due to deposition of $Mg_2Si$, the heat treatment temperature is preferably 400° C. or higher. On the other hand, if the crystal grains become excessively large, since the pattern of the crystal grains is transferred to the antireflection article resulting in the risk of a decrease in the appearance quality of the antireflection article, the heat treatment temperature is preferably 600° C. or lower.

Furthermore, in area A shown in FIG. 1, since the aluminum alloy reaches an area above 300° C. and below 400° C. during cooling following the heat treatment step, there is the possibility of deposition of $Mg_2Si$.

Thus, the following cooling step is carried out after the heat treatment step in the present embodiment.

(Cooling Step)

The cooling step is a step for cooling the aluminum alloy subjected to heat treatment in the case of having heat-treated at 400° C. or higher at a cooling rate of 100° C. per hour over a temperature range of 300° C. to 400° C.

Figure 2:
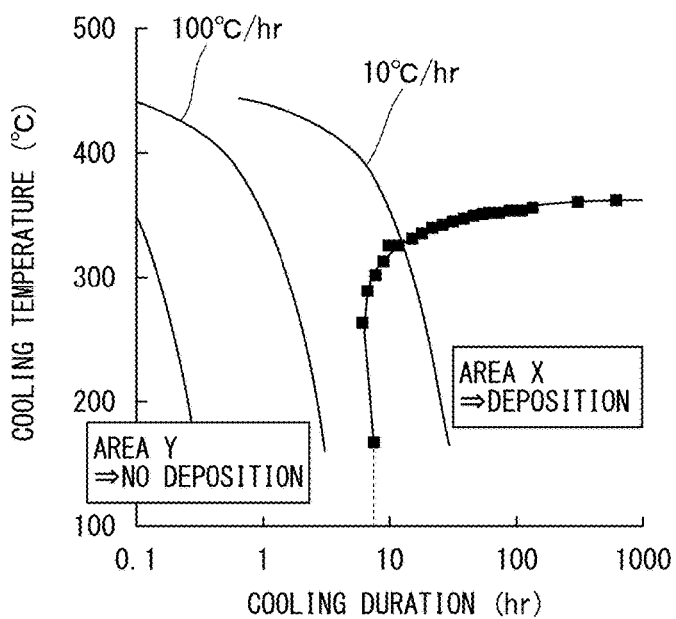
FIG. 2 is a correlation diagram in which the relationship between cooling rate and deposition of Mg₂Si was determined by theoretical calculation.

As a result of focusing on the relationship between cooling rate and deposition of $Mg_2Si$, the inventors of the present invention found that, in the case of having heat-treated at 400° C. or higher, if cooling is carried out at a cooling rate of less than 100° C. per hour over a temperature range of 300° C. to 400° C., $Mg_2Si$ ends up being deposited as shown in FIG. 2.

FIG. 2 is a correlation diagram showing the relationship between cooling rate and deposition of $Mg_2Si$ in which the cooling rate during deposition of 0.001% by mass of $Mg_2Si$ was determined by theoretical calculation by cooling the aluminum alloy from a starting temperature of 450° C.

As shown in FIG. 2, although deposition of $Mg_2Si$ does not occur when cooling rate is within area Y, $Mg_2Si$ is predicted to be deposited when cooling rate enters area X.

Thus, in the present embodiment, in the case of heat treating at 400° C. or higher, deposition of $Mg_2Si$ can be inhibited by cooling the aluminum alloy at a cooling rate of 100° C. per hour or more over a temperature range of 300° C. to 400° C. following the heat treatment step (and particularly after having carried out heat treatment under the conditions of area A shown in FIG. 1). In particular, the aluminum alloy is preferably cooled at the rate of 100° C. per hour or more, preferably at the rate of 300° C. per hour or more and more preferably at the rate of 500° C. per hour or more over a temperature range of 300° C. to 400° C. and preferably over a temperature range of 250° C. to 400° C.

(Machining Step)

The machining step is a step for obtaining a prototype aluminum mold by machining the cooled aluminum alloy to a desired shape.

The aluminum alloy used in the present invention can be easily machined to a desired shape. There are no particular limitations on the machining method.

The shape of the prototype aluminum mold may be that of a plate or roll. If machined into the shape of a roll in particular, a stamper is obtained capable of continuously transferring a fine irregular surface structure, thereby making it possible to enhance the productivity of transfer articles.

In addition, the entirety of the prototype aluminum mold is not required to be composed of the aforementioned aluminum material, but rather a prototype aluminum mold can be used in which at least the surface of the prototype aluminum mold is composed of the aforementioned aluminum material. For example, a prototype aluminum mold can be used in which the surface is composed of the aluminum material and the inside is composed of a material other than the aluminum material by embedding a core material composed of a material other than the aluminum material in a cylindrical aluminum material. Furthermore, in such cases, the composition of the prototype aluminum mold refers to the composition of the aluminum portion on the surface thereof, and does not refer to the composition of the entire prototype aluminum mold to which a core material has been added.

<Action and Effects>

According to the method for manufacturing a prototype aluminum mold of the present invention as explained above, since a specific aluminum alloy is used, precipitation of $Mg_2Si$ can be inhibited and the number of $Mg_2Si$ particles having an equivalent diameter of 10 nm or more on the surface of the prototype aluminum mold can be made to be $10/1000$ $\mu m^2$ or less. Accordingly, since the formation of second phase particles caused by concave defects in the stamper surface can be inhibited, a prototype aluminum mold can be manufactured that allows the obtaining of a stamper in which concave defects have been inhibited.

Furthermore, in the case of carrying out plastic working consisting of hot forging and cold forging, although a structure having less anisotropy can be obtained than in the case of rolling treatment or extrusion treatment since the number of processing directions is 2 or more, there are cases in which a processed structure is obtained after cold forging in which the crystal grains are distended. In such cases, by carrying out a heat treatment step and cooling step under specific conditions following the plastic working step, vestiges of the processed structure are less likely to remain and be transferred to a transfer article.

In addition, lowering the content of Si in the prototype aluminum mold (prototype aluminum mold material) makes it possible to more effectively inhibit deposition of $Mg_2Si$.

However, in order to lower the content of Si in the prototype aluminum mold, it is necessary to use an aluminum base metal having a low Si content or carry out treatment that prevents contamination by equipment and the like used in the casting step, thereby leading to an increase in product cost.

In such cases, if a heat treatment step is carried out under specific conditions following the plastic working step, deposition of $Mg_2Si$ can be inhibited since dispersion of Si can be inhibited and Si can be allowed to melt into the Al matrix without having to use an aluminum base metal having a low Si content or carrying out treatment for preventing contamination.

Use of a prototype aluminum mold obtained according to the method for manufacturing a prototype aluminum mold of the present invention allows the obtaining of a stamper capable of manufacturing transfer articles having few convex defects, namely stampers in which concave defects have been inhibited.

The following provides an explanation of the stamper and the manufacturing method thereof.

[Stamper and Stamper Manufacturing Method]

<Stamper Manufacturing Method>

Figure 3:
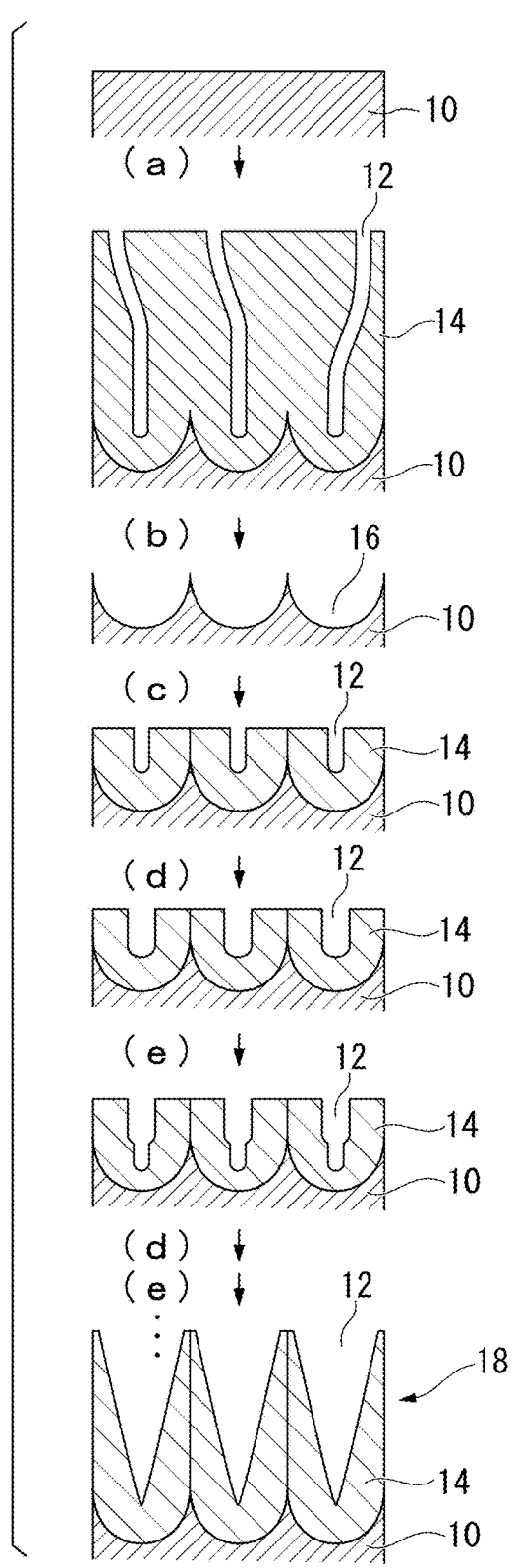
FIG. 3 is a cross-sectional view showing a process for manufacturing a stamper in which an oxide film having a plurality of pores is formed on the surface of a prototype aluminum mold for stampers.

The following provides an explanation while referring to FIG. 3 of an example of a method for manufacturing a stamper in which an oxide film, having a fine irregular surface structure composed of a plurality of pores at an average interval equal to or less than the wavelength of visible light, is formed on the surface thereof by carrying out anodic oxidation on the surface of the prototype aluminum mold of the present invention or a prototype aluminum mold manufactured according to the method for manufacturing a prototype aluminum mold of the present invention.

The method for manufacturing a stamper of the present invention is a method that has the following step (a), preferably further has the following step (b) and step (c), and more preferably further has the following steps (d) to (f):

(a) a step for forming an oxide film on the surface of a prototype aluminum mold by carrying out anodic oxidation on the prototype aluminum mold in an electrolytic solution (first oxide film formation step);

(b) a step for removing the oxide film formed in step (a) following step (a) (oxide film removal step);

(c) a step for forming an oxide film having a plurality of pores by again carrying out anodic oxidation on the prototype aluminum mold in an electrolytic solution following step (b) (second oxide film formation step);

(d) a step for enlarging the diameter of the pores following the aforementioned step (c) or step (e) (pore diameter enlargement treatment step);

(e) a step for repeating anodic oxidation of the prototype aluminum mold in an electrolytic solution following the aforementioned step (d) (oxide film reformation step); and, (f) a step for repeatedly carrying out the aforementioned step (d) and step (e) (repeat step).

According to the method having steps (a) to (f), tapered pores, in which the diameter thereof gradually decreases moving in the direction of depth from the openings thereof, are periodically formed in the surface of a mirrored prototype aluminum mold, and as a result thereof, a stamper can be obtained in which an oxide film having a plurality of pores is formed on the surface thereof.

Furthermore, pretreatment for removing the oxide film on the surface of the prototype aluminum mold may be carried out prior to step (a). An example of a method used to remove the oxide film consists of immersing in a mixed solution of chromic acid and phosphoric acid.

In addition, although the regularity of the pore arrangement decreases somewhat, the method may be carried out starting with step (c) without carrying out step (a) depending on the application of the material to which the surface of the stamper has been transferred.

The following provides a detailed explanation of each step.

(Step (a))

In step (a), the surface of the mirrored prototype aluminum mold is subjected to anodic oxidation at a constant voltage in an electrolytic solution to form an oxide film 14 having pores 12 on the surface of a prototype aluminum mold 10 as shown in FIG. 3.

Examples of the electrolytic solution include acidic electrolytic solutions and alkaline electrolytic solutions, and an acidic electrolytic solution is preferable.

Examples of acidic electrolytic solutions include oxalic acid, sulfuric acid, phosphoric acid and mixtures thereof.

In the case of using oxalic acid for the electrolytic solution, the concentration of the oxalic acid is preferably 0.7 M or less. If the concentration of oxalic acid exceeds 0.7 M, the current value during anodic oxidation becomes excessively high which may cause the surface of the oxide film to become rough.

In addition, the voltage during anodic oxidation is suitably set between 30 V and 80V. By making the voltage during anodic oxidation to be from 30V to 60 V, a stamper can be obtained in which an oxide film having highly regular pores arranged at an average interval of about 100 nm is formed on the surface thereof. Regularity tends to decrease and the average interval may become larger than the wavelength of visible light if the voltage during anodic oxidation is above or below this range.

The temperature of the electrolytic solution is preferably 60° C. or lower and more preferably 45° C. or lower. If the temperature of the electrolytic solution exceeds 60° C., a phenomenon referred to as so-called "burning" tends to occur, thereby causing the pores to be destroyed or causing the surface to melt and disrupting the regularity of the pores.

In the case of using sulfuric acid for the electrolytic solution, the concentration of the sulfuric acid is preferably 0.7 M or less. If the concentration of sulfuric acid exceeds 0.7 M, the current value during anodic oxidation becomes excessively high making it no longer possible to maintain a constant voltage.

In addition, by making the voltage during anodic oxidation to be from 25 V to 30 V, a stamper can be obtained in which an oxide film having highly regular pores arranged at an average interval of about 63 nm is formed on the surface thereof. Regularity tends to decrease and the average interval may become larger than the wavelength of visible light if the voltage during anodic oxidation is above or below this range.

The temperature of the electrolytic solution is preferably 30° C. or lower and more preferably 20° C. or lower. If the temperature of the electrolytic solution exceeds 30° C., a phenomenon referred to as so-called "burning" tends to occur, thereby causing the pores to be destroyed or causing the surface to melt and disrupting the regularity of the pores.

In step (a), the oxide film 14 formed becomes thicker as a result of carrying out anodic oxidation for a long period of time, and although the regularity of the arrangement of the pores 12 can be improved, by making the thickness of the oxide film 14 to be 0.01 µm to 30 µm at that time, macroscopic surface irregularities attributable to crystal grain boundaries are more effectively inhibited, thereby allowing the obtaining of a stamper that is more suitable to the manufacturing of articles for optical applications. The thickness of the oxide film 14 is more preferably 0.5 µm to 10 µm and even more preferably 1 µm to 3 µm. The thickness of the oxide film 14 can be observed with a field emission-scanning electron microscope and the like.

(Step (b))

As a result of removing the oxide film 14 formed by step (a) following step (a), periodic depressions, namely pore generation points 16, are formed corresponding to the bottom portions of the removed oxide film 14 (referred to as a barrier layer) as shown in FIG. 3.

As a result of temporarily removing the formed oxide layer 14 to form pore generation points 16 during anodic oxidation, the regularity of the ultimately formed pores can be improved (refer to, for example, Masuda, "Applied Physics", 2000, Vol. 69, No. 5, p. 558).

An example of a method used to remove the oxide film 14 consists of removing the oxide film with a solution that selectively dissolves alumina without dissolving aluminum. An example of such a solution is a mixture of chromic acid and phosphoric acid.

In step (b), although only a portion of the oxide film 14 may be removed, completely removing the oxide film 14 makes it possible to form pores of higher regularity.

(Step (c))

The oxide film 14 is formed again by again subjecting the prototype aluminum mold 10, in which the pore generation points 16 have been formed, to anodic oxidation at a constant voltage in an electrolytic solution.

In step (c), anodic oxidation is carried out under the same conditions (electrolytic solution concentration, electrolytic solution temperature, formation voltage and the like) as in step (a).

As a result, as shown in FIG. 3, the oxide film 14 can be formed in which columnar pores 12 are formed. In step (c) as well, although pores of greater depth can be obtained the longer the duration of anodic oxidation, in the case of manufacturing a stamper for manufacturing an article for optical applications such as an antireflection article, for example, the oxide film is formed at a thickness of about 0.01 µm to 0.5 µm, and it is not necessary to form an oxide film that is as thick as that formed in step (a).

(Step (d))

Following step (c), the diameter of the pores 12 is enlarged as shown in FIG. 3 by carrying out pore diameter enlargement treatment for enlarging the diameter of the pores 12 formed in step (c).

A specific example of a method for enlarging pore diameter consists of enlarging the diameter of the pores formed in step (c) by etching by immersing in a solution that dissolves alumina. An example of such a solution is an aqueous phosphoric acid solution having a concentration of about 5% by mass. The diameter of the pores becomes larger the longer the duration of step (d).

(Step (e))

As shown in FIG. 3, when anodic oxidation is carried out again, columnar pores having a smaller diameter are further formed extending downward from the bottom portions of the columnar pores 12.

Anodic oxidation may be carried out under the same conditions as in step (a) or the conditions may be altered in various ways. Pores of greater depth can be obtained the longer the duration of anodic oxidation.

(Step (f))

As shown in FIG. 3, the shape of the pores 12 can be made to have a tapered shape, in which the diameter thereof gradually decreases moving in the direction of depth from the openings thereof, by repeating steps (d) and (e), and as a result thereof, a stamper 18 can be obtained in which the oxide film 14 having a plurality of periodical pores 12 is formed on the surface thereof.

Pores of various shapes can be formed by suitably setting the conditions of step (d) and step (e), such as the duration of anodic oxidation or the duration of pore diameter enlargement treatment. Accordingly, these conditions are suitably set corresponding to the application and so forth of the transfer article to be manufactured from the stamper. For example, if steps (d) and (e) are repeated many times at a short interval, pores having a roughly conical shape can be obtained. In addition, by adjusting the duration of step (d) and step (e), pores having an inverted bell shape or pointed shape can be formed, and a stamper can be manufactured in which the shape of the pores has been changed to a suitable shape. In addition, in the case of using this stamper to manufacture an antireflection article such as an antireflective film, since the average interval and depth of the pores can be arbitrarily altered by suitably setting conditions in this manner, the antireflection article can be designed to have the optimum refractive index variation.

<Stamper>

As a result of having a large number of periodic pores formed therein, a stamper manufactured in this manner has a prototype aluminum mold and a fine irregular surface structure formed on the surface of the prototype aluminum mold.

The magnesium content of the prototype aluminum mold is 0.1% by mass to 3% by mass, the silicon content is 100 ppm by mass or less, the total content of elements other than aluminum and magnesium is 500 ppm by mass or less, and the number of magnesium silicide particles having an equivalent diameter of 10 nm or more on the surface of the stamper is 10/1000 $\mu m^2$ or less.

The stamper has a so-called moth-eye structure if the average interval between pores in the fine irregular surface structure is equal to or less than the wavelength of visible light, namely 400 nm or less.

Since scattering of visible light occurs if the average interval between pores is larger than 400 nm, an adequate antireflective function is not demonstrated, thereby making this unsuitable for manufacturing an antireflection article such as an antireflective film.

The average interval between pores is determined by measuring the interval between adjacent pores (the distance from the center of one pore to the center of a pore adjacent thereto) at 50 locations by observing with an electron microscope and the like followed by calculating the average of those values.

In the case the stamper is that used to manufacture an antireflection article such as an antireflective film, in addition to the average interval between pores being equal to or less than the wavelength of visible light, the depth of the pores is preferably 50 nm or more and more preferably 100 nm or more. If the depth of the pores is 50 nm or more, the reflectance of the surface of an article for an optical application formed by transferring the surface of the stamper, namely the transfer surface, decreases. The depth of the pores is preferably 400 nm or less and more preferably 300 nm or less from the viewpoint of mechanical strength of the projections (convex portions) provided on the antireflective film.

Pore depth is determined by measuring the distance from the opening to the deepest portion of the pores at 50 locations when observing with an electron microscope followed by calculating the average of those values.

The aspect ratio (depth/average interval) of the pores of the stamper is preferably 0.5 to 5.0, more preferably 0.8 to 4.5 and particularly preferably 1.2 to 4.0. If the aspect ratio is 0.5 or more, a transfer surface having low reflectance can be formed and the dependencies thereof on incident angle and wavelength can also be adequately reduced. If the aspect ratio is greater than 5.0, mechanical strength of the transfer surface tends to decrease.

The surface of the stamper on which the fine irregular surface structure is formed may be subjected to mold release treatment to facilitate mold separation. Examples of methods used to carry out mold release treatment include a method consisting of coating with a silicone-based polymer or fluorine polymer, a method consisting of vapor-depositing a fluorine compound, and a method consisting of coating with a fluorine-based or fluorosilicone-based silane coupling agent.

<Action and Effects>

According to the method for manufacturing a stamper as explained above, since a stamper is obtained by carrying out anodic oxidation treatment on the previously described prototype aluminum mold of the present invention or prototype aluminum mold manufactured according to the method for manufacturing a prototype aluminum mold of the present invention, a stamper can be manufactured in which concave defects attributable to the sloughing off of second phase particles are inhibited.

Since a stamper obtained in this manner has few concave defects on the surface thereof, it enables the manufacturing of a transfer article having few convex defects.

[Article Manufacturing Method]

The method for manufacturing an article of the present invention is a method for transferring a fine irregular surface structure formed on the surface of a stamper to the surface of an article body using the previously described stamper of the present invention or a stamper manufactured according to the method for manufacturing a stamper of the present invention.

More specifically, an article having a fine irregular surface structure on the surface thereof (transfer article) is obtained according to a method consisting of filling an active energy beam-curable resin composition between the stamper of the present invention and an article body, curing the resin composition by irradiating with an active energy beam, forming a cured resin layer to which the fine irregular surface structure of the stamper has been transferred on the surface of the article body, and separating the article body having the cured resin layer formed on the surface thereof from the stamper (so-called photoimprint method).

<Article Body>

A highly transparent material is preferable for the material of the article body since the article body is irradiated with an active energy beam through the article body, and examples thereof include polycarbonate, polystyrene-based resins, polyester, acrylic resins, cellulose-based resins (such as triacetyl cellulose), polyolefins and glass.

In addition, examples of the shape of the article body include a film, sheet, injected molded article and press molded article.

<Manufacturing Apparatus>

Figure 4:
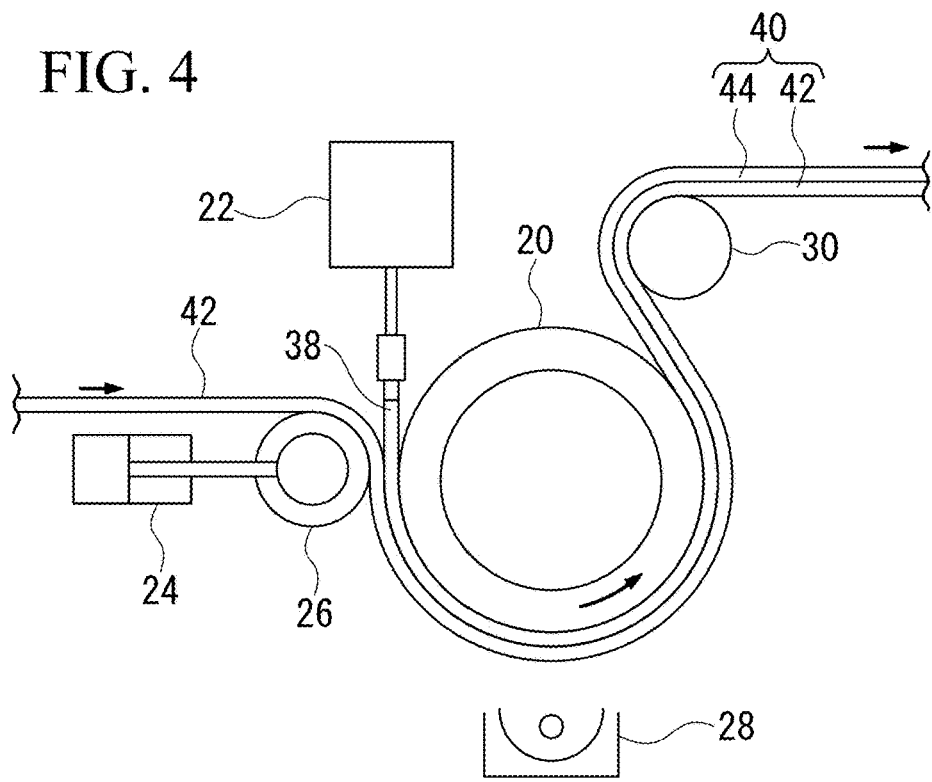
FIG. 4 is a block diagram showing an example of an article manufacturing apparatus.

An article having a fine irregular surface structure on the surface thereof is manufactured in the manner indicated below using, for example, the manufacturing apparatus shown in FIG. 4.

An active energy beam-curable resin composition 38 is supplied from a tank 22 between a roll-shaped stamper 20 having a fine irregular surface structure on the surface thereof and a band-shaped film (article body) 42 that moves along the surface of the roll-shaped stamper 20.

A film 42 and the active energy beam-curable resin composition 38 are nipped between the roll-shaped stamper 20 and nip roller 26 for which the nip pressure thereof has been adjusted with a pneumatic cylinder 24, and simultaneous to the active energy beam-curable resin composition 38 being uniformly transferred between the film 42 and the roll-shaped stamper 20, it is filled into the pores of the fine irregular surface structure of the roll-shaped stamper 20.

The active energy beam-curable resin composition 38 is cured by irradiating with an active energy beam through the film 42 from an active energy beam radiation device 28 installed below the roll-shaped stamper 20, and as a result of the active energy beam-curable resin composition 38 being cured in this manner, a cured resin layer 44 is formed to which the fine irregular surface structure on the surface of the roll-shaped stamper 20 has been transferred.

An article 40 having a fine irregular surface structure on the surface thereof is then obtained by separating the film 42 having the cured resin layer 44 formed on the surface thereof from the roll-shaped stamper 20 with a separation roller 30.

Examples of the active energy beam radiation device 28 include a high-pressure mercury lamp and metal halide lamp.

The amount of radiant energy radiated by the active energy beam is preferably 100 mJ/cm$^2$ to 10000 mJ/cm$^2$.

<Article>

Figure 5:
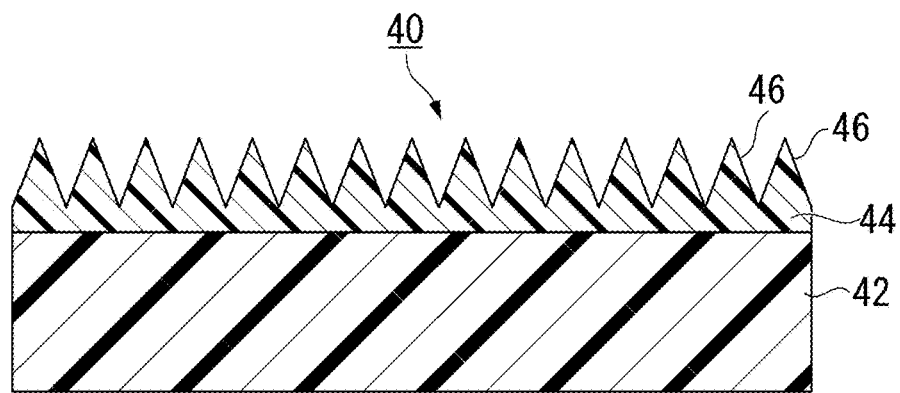
FIG. 5 is a cross-sectional view showing an example of an article.

FIG. 5 is a cross-sectional view showing an example of the article 40 having a fine irregular surface structure on the surface thereof obtained according to the manufacturing method of the present invention.

The cured resin layer 44 is a film composed of the cured product of an active energy beam-curable resin composition to be subsequently described, and has a fine irregular surface structure on the surface thereof.

The fine irregular surface structure on the surface of the article 40 in the case of using the stamper of the present invention is formed by transferring the fine irregular surface structure on the surface of the oxide film of the stamper, and has a plurality of convex portions (projections) 46 composed of the cured product of the active energy beam-curable resin composition.

The fine irregular surface structure is preferably a so-called moth-eye structure in which a plurality of convex portions (projections) having a roughly conical shape or quadrangular pyramidal shape and the like are arranged therein. A moth-eye structure, in which the interval between projections is equal to or less than the wavelength of visible light, is known to be an effective antireflective means since refractive index increases continuously from the refractive index of air to the refractive index of the material.

The average interval between the convex portions is preferably equal to or less than the wavelength of visible light, namely 400 nm or less. In the case of having formed the convex portions using the stamper of the present invention, since the average interval between convex portions is about 100 nm, it is preferably 200 nm or less and particularly preferably 150 nm or less.

In addition, the average interval between convex portions is preferably 20 nm or more from the viewpoint of ease of forming the convex portions.

The average interval between convex portions is determined by measuring the interval between adjacent convex portions (distance from the center of a convex portion to the center of the convex portion adjacent thereto) at 50 locations by observing with an electron microscope followed by calculating the average of those values.

The height of the convex portions in the case of an average interval of 100 nm is preferably 80 nm to 500 nm, more preferably 120 nm to 400 nm and particularly preferably 150 nm to 300 nm. If the height of the convex portions is 80 nm or more, reflectance becomes sufficiently low and there is little wavelength dependency of reflectance. If the height of the convex portions is 500 nm or less, scratch resistance of the convex portions is favorable.

The height of the convex portions is the value determined by measuring the distance between the top of a convex portion and the bottom of a concave portion present between convex portions when observed with an electron microscope at a magnification factor of 30,000×.

The aspect ratio of the convex portions (height of convex portions/average interval between convex portions) is preferably 0.5 to 5.0, more preferably 0.8 to 4.5 and particularly preferably 1.2 to 4.0. If the aspect ratio of the convex portions is 0.5 or more, the article can be adequately used as an ultra-hydrophilic film or ultra-water-repellent film. If the aspect ratio of the convex portions is 5.0 or less, scratch resistance of the convex portions is favorable.

The shape of the convex portions is such that the cross-sectional area of a convex portion in the direction perpendicular to the direction of height increases continuously from the outermost surface in the direction of depth, or in other words, the cross-sectional shape in the direction of height of the convex portions is preferably that of a triangle, trapezoid or bell and the like.

However, in the case of having a moth-eye structure on the surface thereof, ultra-water-repellency is known to be obtained due to the lotus effect if the surface is formed from a hydrophobic material, and an ultra-hydrophilic properties are known to be obtained if the surface is formed from a hydrophilic material.

The water contact angle of the surface of the fine irregular surface structure in the case the material of the cured resin layer 44 is hydrophobic is preferably 90° or more, more preferably 110° or more and particularly preferably 120° or more. If the water contact angle is 90° or more, adequate antifouling properties are demonstrated since the surface is resistant to adherence of water stains. In addition, the surface can also be expected to demonstrate de-icing properties since it is resistant to adherence of water.

The water contact angle of the surface of the fine irregular surface structure in the case the material of the cured resin layer 44 is hydrophilic is preferably 25° or less, more preferably 23° or less and particularly preferably 21° or less. If the water contact angle is 25° or less, soiling that has adhered to the surface can be rinsed off with water, and since the surface is resistant to adherence of oil stains, adequate antifouling properties are demonstrated. The water contact angle is preferably 3° or more from the viewpoint of inhibiting deformation of the fine irregular surface structure caused by moisture adsorption by the cured resin layer 44 along with accompanying increases in reflectance.

<Active Energy Beam-Curable Resin Composition>

The active energy beam-curable resin composition contains a polymerizable compound and a polymerization initiator.

Examples of polymerizable compounds include monomers, oligomers and reactive polymers having a radical polymerizable bond and/or cationic polymerizable bond in a molecule thereof.

Examples of monomers having a radical polymerizable bond include monofunctional monomers and polyfunctional monomers.

Examples of monofunctional monomers include (meth)acrylate derivatives such as methyl(meth)acrylate, ethyl(meth)acrylate, propyl(meth)acrylate, n-butyl(meth)acrylate, i-butyl(meth)acrylate, s-butyl(meth)acrylate, t-butyl(meth)acrylate, 2-ethylhexyl(meth)acrylate, lauryl(meth)acrylate, alkyl(meth)acrylate, tridecyl(meth)acrylate, stearyl(meth)acrylate, cyclohexyl(meth)acrylate, benzyl(meth)

acrylate, phenoxyethyl(meth)acrylate, isobornyl(meth) acrylate, glycidyl(meth)acrylate, tetrahydrofurfuryl(meth) acrylate, allyl(meth)acrylate, 2-hydroxyethyl(meth)acrylate, hydroxypropyl(meth)acrylate, 2-methoxyethyl(meth)acrylate or 2-ethoxyethyl(meth)acrylate, (meth)acrylic acid, (meth)acrylonitrile, styrene and styrene derivatives such as α-methylstyrene, and (meth)acrylamide and (meth)acrylamide derivatives such as N-dimethyl(meth)acrylamide, N-diethyl(meth)acrylamide or dimethylaminopropyl(meth)acrylamide.

One type of these may be used alone or two or more types may be used in combination.

Examples of polyfunctional monomers include bifunctional monomers such as ethylene glycol di(meth)acrylate, tripropylene glycol di(meth)acrylate, isocyanuric acid ethylene oxide-modified di(meth)acrylate, triethylene glycol di(meth)acrylate, diethylene glycol di(meth)acrylate, neopentyl glycol di(meth)acrylate, 1,6-hexanediol di(meth) acrylate, 1,5-pentanedio di(meth)acrylate, 1,3-butylene glycol di(meth)acrylate, polybutylene glycol di(meth)acrylate, 2,2-bis(4-(meth)acryloxypolyethoxyphenyl) propane, 2,2-bis(4-(meth)acryloxyethoxyphenyl) propane, 2,2-bis(4-(3-(meth)acryloxy-2-hydroxypropoxy)phenyl) propane, 1,2-bis (3-(meth)acryloxy-2-hydroxypropoxy) ethane, 1,4-bis(3-(meth)acryloxy-2-hydroxypropoxy) butane, dimethylol trichlorodecane di(meth)acrylate, bisphenol A ethylene oxide adduct di(meth)acrylate, bisphenol A propylene oxide adduct di(meth)acrylate, hydroxypivalic acid neopentyl glycol di(meth)acrylate, divinylbenzene or methylenebisacrylamide, trifunctional monomers such as pentaerythritol tri (meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate or isocyanuric acid ethylene oxide-modified tri(meth)acrylate, monomers having four or more functional groups such as condensation reaction mixtures of succinic acid, trimethylolethane and acrylic acid, dipentaerythritol hexa(meth) acrylate, dipentaerythritol penta(meth)acrylate, ditrimethylolpropane tetraacrylate or tetramethylolpropane tetra(meth) acrylate, urethane acrylates having two or more functional groups and polyester acrylates having two or more functional groups.

One type of these may be used alone or two or more types may be used in combination.

Examples of monomers having a cationic polymerizable bond include monomers having an epoxy group, oxetanyl group, oxazolyl group or vinyloxy group and the like, and monomers having an epoxy group are preferable.

Examples of oligomers or reactive polymers include unsaturated polyesters such as condensates of an unsaturated dicarboxylic acid and a polyvalent alcohol, and polyester (meth)acrylates, polyether(meth)acrylates, polyol(meth) acrylates, epoxy(meth)acrylates, urethane(meth)acrylates, cationic polymerizable epoxy compounds and homopolymers or copolymers of the aforementioned monomers having a radical polymerizable bond in a side chain thereof.

In the case of using a photocuring reaction, examples of photopolymerization initiators include carbonyl compounds such as benzoin, benzoin methyl ether, benzoin ethyl ether, benzoin isopropyl ether, p-methoxybenzophenone, 2,2-diethoxyacetophenone, α,α-dimethoxy-α-phenylacetophenone, methyl phenyl glyoxylate, ethyl phenyl glyoxylate, 4,4'-bis(dimethylamino)benzophenone or 2-hydroxy-2-methyl-1-phenylpropan-1-one, sulfur compounds such as tetramethylthiuram monosulfide or tetramethylthiuram disulfide, 2,4,6-trimethylbenzoyl diphenylphosphine oxide and benzoyldiethoxyphosphine oxide.

One type of these may be used alone or two or more types may be used in combination.

In the case of using an electron beam curing reaction, examples of polymerization initiators include thioxanthones such as benzophenone, 4,4-bis(diethylamino)benzophenone, 2,4,6-trimethylbenzophenone, methyl ortho benzoyl benzoate, 4-phenylbenzophenone, t-butylanthraquinone, 2-ethylanthraquinone, 2,4-diethylthioxanthone, isopropylthioxanthone or 2,4-dichlorothioxanthone, acetophenones such as diethoxyacetopheone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one or 2-benzyl-2-dimethylamino-1-(4-morpholinophenyl) butanone, benzoin ethers such as benzoin methyl ether, benzoin ethyl ether, benzoin isopropyl ether or benzoin isobutyl ether, acyl phosphine oxides such as 2,4,6-trimethylbenzoyldiphenyl phosphine oxide, bis(2, 6-dimethoxybenzoyl)-2,4,4-trimethylpentylphosphine oxide or bis(2,4,6-trimethylbenzoyl)phenyl phosphine oxide, methyl benzoylformate, 1,7-bisacryidinyl heptane and 9-phenylacridine.

One type of these may be used alone or two or more types may be used in combination.

In the case of using a thermal curing reaction, examples of thermal polymerization initiators include organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate or lauroyl peroxide, azo-based compounds such as azobisisobutyronitrile, and redox polymerization initiators combining the aforementioned organic peroxides with an amine such as N,N-dimethylaniline or N,N-dimethyl-p-toluidine.

The amount of polymerization initiator is preferably 0.1 parts by mass to 10 parts by mass based on 100 parts by mass of the polymerizable compound. If the amount of polymerization initiator is less than 0.1 parts by mass, it becomes difficult for polymerization to proceed. If the amount of polymerization initiator exceeds 10 parts by mass, the cured film may become colored or mechanical strength may decrease.

The active energy beam-curable resin composition may also contain a non-reactive polymer, active energy beam sol-gel reactive composition, antistatic agent, additive such as a fluorine compound for improving antifouling properties, fine particles or a small amount of solvent as necessary.

Examples of non-reactive polymers include acrylic resins, styrene-based resins, polyurethanes, cellulose-based resins, polyvinyl butyral, polyesters and thermoplastic elastomers.

Examples of active energy beam sol-gel reactive compositions include alkoxysilane compounds and alkyl silicate compounds.

Examples of alkoxysilane compounds include tetramethoxysilane, tetra-i-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane and trimethylbutoxysilane.

Examples of alkyl silicate compounds include methyl silicate, ethyl silicate, isopropyl silicate, n-propyl silicate, n-butyl silicate, n-pentyl silicate and acetyl silicate.

(Hydrophobic Material)

In order to make the water contact angle of the surface of the fine irregular surface structure of the cured resin layer 90° or more, it is preferable to use an active energy beam-curable resin composition able to form a hydrophobic material that contains a fluorine-containing compound or silicone-based compound.

Fluorine-Containing Compound:

Examples of fluorine-containing compounds include fluorine-containing monomers, fluorine-containing silane coupling agents, fluorine-containing surfactants and fluorine-containing polymers.

Examples of fluorine-containing monomers include fluoroalkyl group-substituted vinyl monomers and fluoroalkyl group-substituted ring-opening polymerizable monomers.

Examples of fluoroalkyl group-substituted vinyl monomers include fluoroalkyl group-substituted (meth)acrylate, fluoroalkyl group-substituted vinyl ether and fluoroalkyl group-substituted styrene.

Examples of fluoroalkyl group-substituted ring-opening polymerizable monomers include fluoroalkyl group-containing epoxy compounds, fluoroalkyl group-substituted oxetane compounds and fluoroalkyl group-substituted oxazoline compounds.

Examples of fluorine-containing silane coupling agents include 3,3,3-trifluoropropyltrimethoxysilane, 3,3,3-trifluorotriacetoxysilane, dimethyl-3,3,3-trifluoropropylmethoxysilane and tridecafluoro-1,1,2,2-tetrahydrooctyltriethoxysilane.

Examples of fluorine-containing surfactants include fluoroalkyl group-substituted anionic surfactants and fluoroalkyl group-substituted cationic surfactants.

Examples of fluorine-containing polymers include polymers of fluoroalkyl group-substituted monomers, copolymers of fluoroalkyl group-substituted monomers and poly(oxyalkylene) group-containing monomers, and copolymers of fluoroalkyl group-containing monomers and crosslinkable group-containing monomers. The fluorine-containing polymer may also be a copolymer with another copolymerizable monomer.

Silicone-Based Compound:

Examples of silicon-based compounds include (meth)acrylic acid-modified silicone, silicone resin and silicone-based silane coupling agents.

Examples of (meth)acrylic acid-modified silicone include silicone(di)(meth)acrylate, and silicon diacrylates such as "x-22-164" or "x-22-1602" manufactured by Shin-Etsu Chemical Co., Ltd. are used preferably.

(Hydrophilic Material)

In order to make the water contact angle of the surface of the fine irregular surface structure of the cured resin layer 25° or less, it is preferable to use an active energy beam-curable resin composition able to form a hydrophilic material that at least contains a hydrophilic monomer. In addition, the hydrophilic material more preferably contains a crosslinkable polyfunctional monomer from the viewpoints of scratch resistance and imparting water resistance. Furthermore, the polyfunctional monomer capable of crosslinking with a hydrophilic monomer may be the same monomer (namely, a hydrophilic polyfunctional monomer). Moreover, the active energy beam-curable resin composition may also contain other monomers.

A composition containing a polyfunctional (meth)acrylate having four or more functional groups, a hydrophilic (meth)acrylate having two or more functional groups and, as necessary, a monofunctional monomer is more preferably used for the active energy beam-curable resin composition able to form a hydrophilic material.

Examples of polyfunctional (meth)acrylates having four or more functional groups include ditrimethylolpropane tetra(meth)acrylate, pentaerythritol tetra(meth)acrylate, pentaerythritol ethoxytetra(meth)acrylate, dipentaerythritol hydroxypenta(meth)acrylate, dipentaerythritol hexa(meth)acrylate, condensation reaction mixtures of succinic acid, trimethylolethane and acrylic acid at a molar ratio of 1:2:4, urethane acrylates (such as Ebecryl 220, Ebecryl 1290, Ebecryl 1290K, Ebecryl 5129, Ebecryl 8210, Ebecryl 8301 or KRM 8200 manufactured by Daicel-Cytec Co., Ltd.), polyether acrylates (such as Ebecryl 81 manufactured by Daicel-Cytec Co., Ltd.), and modified epoxy acrylates (such as Ebecryl 450, Ebecryl 657, Ebecryl 800, Ebecryl 810, Ebecryl 811, Ebecryl 812, Ebecryl 1830, Ebecryl 845, Ebecryl 846 or Ebecryl 1870 manufactured by Daicel-Cytec Co., Ltd.). One type of these may be used alone or two or more types may be used in combination.

Polyfunctional (meth)acrylates having five or more functional groups are more preferable for use as polyfunctional (meth)acrylates having four or more functional groups.

The ratio of polyfunctional (meth)acrylate having four or more functional groups is preferably 10% by mass to 90% by mass, more preferably 20% by mass to 90% by mass and particularly preferably 30% by mass to 90% by mass based on the total mass of all monomers that compose the active energy beam-curable resin composition. If the ratio of polyfunctional (meth)acrylate having four or more functional groups is 10% by mass or more, modulus of elasticity is high and scratch resistance improves. If the ratio of polyfunctional (meth)acrylate having four or more functional groups is 90% by mass or less, it becomes difficult for small cracks to form in the surface thereby resulting in less susceptibility to appearance defects.

Examples of hydrophilic (meth)acrylates having two or more functional groups include polyfunctional acrylates and polyethylene glycol dimethacrylates having a long-chain polyethylene glycol such as Aronix M240, Aronix M260 (manufactured by Toagosei Co., Ltd.), NK Ester AT-20E or NK Ester ATM-35E (manufactured by Shin-Nakamura Chemical Co., Ltd.). One type of these may be used alone or two or more types may be used in combination.

In a polyethylene glycol dimethacrylate, the total of the average number of repeating units of the polyethylene glycol chains present in a molecule thereof is preferably 6 to 40, more preferably 9 to 30 and particularly preferably 12 to 20. If the average number of repeating units of the polyethylene glycol chains is 6 or more, hydrophilicity is adequate and antifouling properties improve. If the average number of repeating units of the polyethylene glycol chains is 40 or less, compatibility with polyfunctional (meth)acrylates having four or more functional groups is favorable and it becomes difficult for the active energy beam-curable resin composition to separate.

The ratio of hydrophilic (meth)acrylate having two or more functional groups is preferably 3% by mass to 90% by mass and more preferably 3% by mass to 70% by mass based on the total mass of all monomers that compose the active energy beam-curable resin composition. If the ratio of hydrophilic (meth)acrylate having two or more functional groups is 3% by mass or more, hydrophilicity is adequate and antifouling properties improve. If the ratio of hydrophilic (meth)acrylate having two or more functional groups is 90% by mass or less, modulus of elasticity is high and scratch resistance improves.

The monofunctional monomer is preferably a hydrophilic monofunctional monomer.

Examples of hydrophilic monofunctional monomers include monofunctional (meth)acrylates having a polyethylene glycol chain in an ester group such as M-20G, M-90G or M-230G (manufactured by Shin-Nakamura Chemical Co., Ltd.), monofunctional acrylamides, and cationic monomers such as methacrylamidopropyl trimethylammonium methyl sulfate or methacryloyloxyethyl trimethylammonium methyl sulfate.

In addition, viscosity adjusters such as acryloyl morpholine or vinylpyrrolidone or adhesion improvers such as acryloyl isocyanurates for improving adhesion to an article body may be used as monofunctional monomers.

The ratio of monofunctional monomer is preferably 0% by mass to 20% by mass and more preferably 5% by mass to 15% by mass based on the total mass of all monomers that compose the active energy beam-curable resin composition. The use of a monofunctional monomer improves adhesion between the base material and cured resin. If the ratio of monofunctional monomer is 20% by mass or less, antifouling properties or scratch resistance is adequately demonstrated without a shortage of polyfunctional (meth)acrylate having four or more functional groups or hydrophilic (meth)acrylate having two or more functional groups.

The monofunctional monomer may be incorporated in the active energy beam-curable resin composition at 0 parts by mass to 35 parts by mass in the form of a polymer having a low degree of polymerization obtained by (co)polymerizing one type or two or more types thereof. Examples of polymers having a low degree of polymerization include copolymer oligomers of monofunctional (meth)acrylates having a polyethylene glycol chain in an ester group, such as M-230G (manufactured by Shin-Nakamura Chemical Co., Ltd.), and methacrylamidopropyl trimethylammonium methyl sulfate at a ratio of 40/60 (such as MG Polymer manufactured by MRC Unitec Co., Ltd.).

Action and Effects

According to the method for manufacturing an article of the present invention as explained above, a stamper obtained by carrying out anodic oxidation treatment on the previously described prototype aluminum mold of the present invention or a prototype aluminum mold manufactured according to the method for manufacturing a prototype aluminum mold of the present invention, is used. According to the present invention, the stamper allows the obtaining of an article having few convex defects (convex defects (confetti-like defects D) shown in FIG. 6, for example) since concave defects are inhibited in the surface thereof. More specifically, an article is easily obtained in which the number of convex defects having an equivalent diameter of 500 nm or more is 20/1000 $\mu m^2$ or less.

An article obtained according to the present invention demonstrates various performance such as antireflection performance or water repellence performance due to the fine irregular surface structure on the surface thereof. Examples of applications of the article include antireflection articles, antifogging articles, antifouling articles and water repellent articles, and more specifically, antireflective films for displays, automobile instrument panel covers, automobile mirrors, automobile windows, members for improving the light extraction efficiency of organic or inorganic electroluminescence devices and solar cell members.

In the case the article is an antireflection article, for example, the antireflection article has a transparent base material for the article body and a fine irregular surface structure that is formed on the transparent base material and is composed of a plurality of projections having an average interval equal to or less than the wavelength of visible light.

In addition, since this antireflection article is manufactured using the aforementioned stamper, the number of convex defects having an equivalent diameter of 500 nm or more on the surface of the fine irregular surface structure is easily made to be 20/1000 $\mu m^2$ or less and preferably 10/1000 $\mu m^2$ or less. In addition, haze is easily made to be 0.5% or less and preferably 0.3% or less.

Here, "transparent" refers to allowing the transmission of an active energy beam.

EXAMPLES

Although the following provides a more detailed explanation of the present invention through examples thereof, the present invention is not limited thereto.

Example 1

Manufacturing of Prototype Aluminum Mold 1.14% by mass of Mg was added to Al having a purity of 99.995% by mass and melted therein. A cast (prototype aluminum mold material) having a length of 3850 mm was cast from this molten metal with a DC casting mold having a thickness of 508 mm and width of 1110 mm under casting conditions consisting of a casting temperature of 680° C., casting rate of 52 mm/min and cooling water flow rate of 230 L/min/1 m of mold length (casting step).

During this casting, a refining agent (Al—Ti—B) was continuously added to the molten metal flowing into the mold such that the increase in the content of Ti was 8 ppm in comparison with prior to addition and the increase in the content of B was 2 ppm prior to addition to obtain an ingot having an Al purity (content) of 98.86% by mass, Si content of 14 ppm by mass, Fe content of 6 ppm by mass, Ti content of 8 ppm by mass, B content of 4 ppm by mass and total content of other elements of 14 ppm by mass. The average crystal grain size of the resulting ingot was 140 µm. The component composition of the prototype aluminum mold material is shown in Table 1.

Furthermore, "average crystal grain size" of the ingot refers to the average value of circle equivalent diameter as calculated for 100 or more arbitrarily selected crystal grains on a processed surface of the ingot. The average value of circle equivalent diameter was determined using the "Image-Pro PLUS" image analysis software available from Nippon Roper K.K.

Next, a piece of aluminum alloy measuring 331 mm×331 mm×508 mm was cut out from the resulting ingot and used as a forged material. This forged material was heated (preheated) to 373° C. followed by carrying out a first round of hot forging consisting of 3 cycles of 0.75U–(1.5S–2/3U) and ending at 374° C. Next, after reheating (preheating) to 361° C., a second round of hot forging was carried out consisting of 3 cycles of (1.5S–2/3U) and ending at 329° C.

After cooling the forged material to 35° C. following hot forging, cold forging was carried out consisting of 2 cycles of (1.5S–2/3U) and 3.1S to form into a shape measuring φ245 mm×1180 mm long followed by ending at 145° C. (plastic working step). The conditions and so forth of hot forging and cold forging are shown in Table 2.

Next, the forged material was cut to a length of 350 mm after cold forging, and this was subjected to heat treatment consisting of heating to 400° C. at a heating rate of 50° C./hr and holding for 1 hour at 400° C. (heat treatment step), and then subjected to water cooling (cooling step) to obtain an prototype aluminum mold. Furthermore, the cooling rate in the cooling step was about 10000° C./hr.

The prototype aluminum mold was observed for the deposition of second phase particles in the manner indicated below before and after the heat treatment step.

First, a sample measuring 20 mm×20 mm×20 mm was sampled from the prototype aluminum mold prior to the heat treatment step, and when the sample was observed for the presence of second phase particles ($Mg_2Si$), deposition of $Mg_2Si$ was not observed. Furthermore, observation of second phase particles was carried out with a TEM by mechanically polishing the sample with emery paper followed by preparing a thin section with an Ion Slicer.

In addition, when the $Mg_2Si$ was quantified using backscattered electron images of a scanning electron microscope (SEM), the number of $Mg_2Si$ particles having an equivalent diameter of 10 nm or more on the surface of the prototype aluminum mold was $0/1000$ $\mu m^2$ in the case of the prototype aluminum mold prior to the heat treatment step and $0.3/1000$ $\mu m^2$ in the case of the prototype aluminum mold after the heat treatment step.

Moreover, measurement of the average crystal grain size of the prototype aluminum mold after the heat treatment step using the same method as that used to measure average crystal grain size of the ingot yielded a value of 134 μm.

<Evaluation>
(Manufacturing of Stamper)

The previously described steps (a) to (f) were carried out using the resulting prototype aluminum mold to obtain a plate-shaped stamper in which anodically oxidized alumina was formed on the surface thereof that had a plurality of roughly conically shaped pores having an average interval of 100 nm and depth of 150 nm.

The resulting stamper was immersed in a dilute 0.1% by mass solution of Optool DSX (Daikin Industries, Ltd.) and air-dried overnight to treat the surface of the anodically oxidized alumina with a mold release agent.

Furthermore, the pores of the anodically oxidized alumina were measured in the manner indicated below.

A portion of the anodically oxidized alumina was cut away, platina was vapor-deposited on the resulting cross-section for 1 minute, and the cross-section was observed under conditions of an acceleration voltage of 3.00 kV using a field emission-scanning electron microscope (JSM-7400F, JEOL Ltd.) followed by measurement of the interval between pores and pore depth. Each measurement was carried out at 50 locations followed by determination of the average value thereof.

(Preparation of Active Energy Beam-Curable Resin Composition)

45 parts by mass of a condensation reaction mixture of succinic acid, trimethylolethane and acrylic acid at a molar ratio of 1:2:4, 45 parts by mass of 1,6-hexanediol diacrylate (Osaka Organic Chemical Industry, Ltd.), 10 parts by mass of radical polymerizable silicone oil (X-22-1602, Shin-Etsu Chemical Co., Ltd.), 3 parts by mass of 1-hydroxycyclohexyl phenyl ketone (Irgacure® 184, Ciba Specialty Chemicals Corp.), and 0.2 parts by mass of bis(2,4,6-trimethylbenzoyl)-phenyl phosphine oxide (Irgacure® 819, Ciba Specialty Chemicals Corp.)

were mixed to obtain an active energy beam-curable resin composition.

(Manufacturing of Article) The active energy beam-curable resin composition was coated onto the surface of the stamper and covered with an acrylic film having a thickness of 100 μm (HBK003, Mitsubishi Rayon Co., Ltd.).

After curing the active energy beam-curable resin composition by irradiating with ultraviolet light through the acrylic film at a cumulative exposure level of 1000 $mJ/cm^2$ using an ultraviolet irradiation device (Fusion Lamp, D Bulb), the resin composition was separated from the stamper to obtain an article in which a cured resin film, having a thickness of 10 μm and having an irregular surface structure composed of a plurality of conically shaped convex portions on the surface thereof, was formed on the surface thereof (transfer article).

The average interval between the convex portions was 100 nm, the height of the convex portions was about 150 nm and the width of the bottoms of the convex portions was 100 nm.

Furthermore, the convex portions of the cured resin layer were measured in the manner indicated below.

Platina was vapor-deposited on a fractured cross-section of the cured resin layer for 10 minutes followed by observing the cross-section in the same manner as during measurement of pores of the anodically oxidized alumina and measuring the interval between the convex portions and height of the convex portions. Each measurement was carried out at 50 locations followed by determination of the average value thereof.

The resulting article surface was observed with an SEM followed by measurement of the number of convex defects (confetti-like defects) D as shown in FIG. 6. Measurements were carried out five times followed by determination of the average value thereof.

In addition, haze of the resulting article was measured using a haze meter (Suga Test Instruments Co., Ltd.) in compliance with ISO 13468-1:1996 (JIS K7361-1:1997).

Those results are shown in Table 3.

Example 2

0.28% by mass of Mg was added to Al having purity of 99.995% by mass and melted therein. An ingot (prototype aluminum mold material) having a length of 3850 mm was cast from this molten metal with a DC casting mold having a thickness of 508 mm and width of 1110 mm under casting conditions consisting of a casting temperature of 680° C., casting rate of 52 mm/min and cooling water flow rate of 230 L/min/1 m of mold length (casting step).

During this casting, a refining agent (Al—Ti—B) was continuously added to the molten metal flowing into the mold such that the increase in the content of Ti was 8 ppm in comparison with prior to addition and the increase in the content of B was 2 ppm prior to addition to obtain an ingot having an Al purity (content) of 99.72% by mass, Si content of 13 ppm by mass, Fe content of 5 ppm by mass, Ti content of 10 ppm by mass, B content of 4 ppm by mass and total content of other elements of 19 ppm by mass. The average crystal grain size of the resulting ingot was 140 μm. The component composition of the prototype aluminum mold material is shown in Table 1.

Next, a piece of aluminum alloy measuring 331 mm×331 mm×508 mm was cut out from the resulting ingot and used as a forged material. This forged material was heated (preheated) to 370° C. followed by carrying out a first round of hot forging consisting of 3 cycles of 0.75U–(1.5S–2/3U) and ending at 330° C. Next, after reheating (preheating) to 360° C., a second round of hot forging was carried out consisting of 3 cycles of (1.5S–2/3U) and ending at 320° C.

After cooling the forged material to 28° C. following hot forging, cold forging was carried out consisting of 2 cycles of (1.5S–2/3U) and 3.1S to form into a shape measuring φ245 mm×1180 mm long followed by ending at 130° C. (plastic working step). The conditions and so forth of hot forging and cold forging are shown in Table 2.

Next, a heat treatment step and cooling step were carried out in the same manner as Example 1 using the forged material after cold forging to obtain a prototype aluminum mold.

When the prototype aluminum mold was observed for deposition of second phase particles in the same manner as Example 1 before and after the heat treatment step, deposition of $Mg_2Si$ was not observed.

In addition, when the $Mg_2Si$ was quantified using SEM backscattered electron images, the number of $Mg_2Si$ particles having an equivalent diameter of 10 nm or more on the surface of the prototype aluminum mold was 1.2/1000 μm² in the case of the prototype aluminum mold prior to the heat treatment step and 0.3/1000 μm² in the case of the prototype aluminum mold after the heat treatment step.

Moreover, measurement of the average crystal grain size of the prototype aluminum mold after the heat treatment step using the same method as that used to measure average crystal grain size of the ingot yielded a value of 166 μm.

In addition, a stamper was fabricated in the same manner as Example 1 using the resulting prototype aluminum mold followed by manufacturing an article and measuring the number of convex defects and haze. Those results are shown in Table 3.

Comparative Example 1

1.04% by mass of Mg was added to Al having purity of 99.995% by mass and melted therein. An ingot (prototype aluminum mold material) having a length of 3850 mm was cast from this molten metal with a DC casting mold having a thickness of 508 mm and width of 1110 mm under casting conditions consisting of a casting temperature of 680° C., casting rate of 52 mm/min and cooling water flow rate of 230 L/min/1 m of mold length (casting step).

During this casting, a refining agent (Al—Ti—B) was continuously added to the molten metal flowing into the mold such that the increase in the content of Ti was 8 ppm in comparison with prior to addition and the increase in the content of B was 2 ppm prior to addition to obtain an ingot having an Al purity (content) of 98.96% by mass, Si content of 20 ppm by mass, Fe content of 9 ppm by mass, Ti content of 9 ppm by mass, B content of 4 ppm by mass and total content of other elements of 15 ppm by mass. The average crystal grain size of the resulting ingot was 350 μm. The component composition of the prototype aluminum mold material is shown in Table 1.

Next, a piece of aluminum alloy measuring 331 mm×331 mm×508 mm was cut out from the resulting ingot and used as a forged material. This forged material was heated (preheated) to 369° C. followed by carrying out a first round of hot forging consisting of 3 cycles of 0.75U–(1.5S–2/3U) and ending at 325° C. Next, after reheating (preheating) to 360° C., a second round of hot forging was carried out consisting of 3 cycles of (1.5S–2/3U) and ending at 319° C.

After cooling the forged material to 30° C. following hot forging, cold forging was carried out consisting of 2 cycles of (1.5S–2/3U) and 3.1S to form into a shape measuring φ245 mm×1180 mm long followed by ending at 173° C. (plastic working step). The conditions and so forth of hot forging and cold forging are shown in Table 2.

Next, following the plastic working step, heat treatment was carried out consisting of heating the forged material following cold forging to 350° C. at a heating rate of 100° C./hr and holding for 1 hour at 350° C. (heat treatment step), followed by subjecting to air cooling to 50° C. over the course of 12 hours (cooling step) to obtain a prototype aluminum mold.

When the prototype aluminum mold was observed for deposition of second phase particles in the same manner as Example 1 before and after the heat treatment step, deposition of $Mg_2Si$ was not observed.

In addition, when the $Mg_2Si$ was quantified using SEM backscattered electron images, the number of $Mg_2Si$ particles having an equivalent diameter of 10 nm or more on the surface of the prototype aluminum mold was 0.2/1000 μm² in the case of the prototype aluminum mold prior to the heat treatment step and 12.3/1000 μm² in the case of the prototype aluminum mold after the heat treatment step.

Moreover, measurement of the average crystal grain size of the prototype aluminum mold after the heat treatment step using the same method as that used to measure average crystal grain size of the ingot yielded a value of 63 μm.

In addition, a stamper was fabricated in the same manner as Example 1 using the resulting prototype aluminum mold followed by manufacturing an article and measuring the number of convex defects and haze. Those results are shown in Table 3.

TABLE 1

| | Component Composition | | | | | | | |
|---|---|---|---|---|---|---|---|---|
| | Al | Mg | Elements other than Al and Mg (mass ppm) | | | | | |
| | (mass %) | (mass %) | Si | Fe | Ti | B | Other | Total |
| Ex. 1 | 98.86 | 1.14 | 14 | 6 | 8 | 4 | 14 | 46 |
| Ex. 2 | 99.72 | 0.28 | 13 | 5 | 10 | 4 | 19 | 51 |
| Comp. Ex. 1 | 98.96 | 1.04 | 20 | 9 | 9 | 4 | 15 | 57 |

TABLE 2

| | Hot Forging: Round 1 | | Hot Forging: Round 2 | | Cold Forging: Round 1 | | Heat Treatment (° C. × min) | Cooling Conditions |
|---|---|---|---|---|---|---|---|---|
| | Conditions | Temp. (° C.) | Conditions | Temp. (° C.) | Conditions | Temp. (° C.) | | |
| Ex. 1 | 0.75U–(1.5S–2/3U) × 3 cycles | 373→347 | (1.5S–2/3U) × 3 cycles | 361→329 | (1.5S–2/3U) × 2cycles-3.1S | 35→145 | 400 × 60 | Water cooling |
| Ex. 2 | 0.75U–(1.5S–2/3U) × 3 cycles | 370→330 | (1.5S–2/3U) × 3 cycles | 360→320 | (1.5S–2/3U) × 2cycles-3.1S | 28→130 | 400 × 60 | Water cooling |

TABLE 2-continued

| | Hot Forging: Round 1 | | Hot Forging: Round 2 | | Cold Forging: Round 1 | | Heat Treatment | Cooling |
|---|---|---|---|---|---|---|---|---|
| | Conditions | Temp. (° C.) | Conditions | Temp. (° C.) | Conditions | Temp. (° C.) | (° C. × min) | Conditions |
| Comp. Ex. 1 | 0.75U-(1.5S-⅔U) × 3 cycles | 369→325 | (1.5S-⅔U) × 3 cycles | 360→319 | (1.5S-⅔U) × 2cycles-3.1S | 30→173 | 350 × 60 | Air cooling |

TABLE 3

| | Average crystal grain size of prototype aluminum mold (μm) | No. of Mg₂Si particles on surface of prototype aluminum mold (/1000 μm²) | | No. of convex defects on article surface (/1000 μm²) | Article haze (%) |
|---|---|---|---|---|---|
| | | Before heat treatment | After heat treatment | | |
| Ex. 1 | 134 | 0 | 0.3 | 6.3 | 0.27 |
| Ex. 2 | 166 | 1.2 | 0.3 | 3 | 0.22 |
| Comp. Ex. 1 | 63 | 0.2 | 12.3 | 186 | 0.78 |

As is clear from Table 3, according to the prototype aluminum molds obtained in Examples 1 and 2, stampers were able to be obtained that were capable of manufacturing transfer articles having few convex defects. In comparison with Comparative Example 1, in which the heat treatment step was carried out at a heat treatment temperature of 300° C. to below 400° C., Examples 1 and 2 demonstrated a lower number of Mg₂Si particles on the surface of the prototype aluminum mold following the heat treatment step. In addition, the numbers of convex defects on the surface of the transfer articles were also lower in Examples 1 and 2 in comparison with Comparative Example 1, and the haze values of the articles were also lower.

INDUSTRIAL APPLICABILITY

According to the prototype aluminum mold for stampers of the present invention, a stamper can be obtained that is capable of manufacturing a transfer article having few convex defects.

In addition, according to the method for manufacturing a prototype aluminum mold for stampers of the present invention, a prototype aluminum mold for stampers is obtained that allows the obtaining of a stamper capable of manufacturing a transfer article having few convex defects.

In addition, according to the method for manufacturing a stamper of the present invention, a stamper is obtained that is capable of manufacturing a transfer article having few convex defects.

In addition, use of the stamper of the present invention enables the manufacturing of a transfer article having few convex defects.

In addition, according to the method for manufacturing an article of the present invention, an article is obtained that has few convex defects.

In addition, the antireflection article of the present invention has few convex defects.

BRIEF DESCRIPTION OF THE REFERENCE SYMBOLS

10 Prototype aluminum mold for stampers
12 Pores
14 Oxide film
18 Stamper
20 Roll-shaped stamper
40 Article
42 Film (article body)
46 Convex portions (projections)

The invention claimed is:

1. A prototype aluminum mold for stampers containing aluminum and magnesium that is used in the manufacturing of stampers having a fine irregular surface structure on the surface thereof, wherein,
the content of magnesium is 0.1% by mass to 3% by mass, the content of silicon is 100 ppm by mass or less, the total content of elements other than aluminum and magnesium is 500 ppm by mass or less,
the prototype aluminum mold for stampers contains magnesium silicide particles and the majority of the magnesium silicide particles having an equivalent diameter of 10 nm to 250 nm, and
the number of magnesium silicide particles having an equivalent diameter of 10 nm to 250 nm on the surface of the prototype aluminum mold for stampers is 10/1000 μm² or less.

2. The prototype aluminum mold for stampers according to claim 1, wherein the number of magnesium silicide particles having an equivalent diameter of 10 nm to 250 nm is 8/1000 μm² or less.

3. A stamper used in the manufacturing of articles having a fine irregular surface structure on the surface thereof, wherein
the stamper has a prototype aluminum mold, and
the prototype aluminum mold having a fine irregular surface structure formed on the surface of the prototype aluminum mold in which the average interval between pores is equal to or less than the wavelength of visible light, and
the content of magnesium in the prototype aluminum mold is 0.1% by mass to 3% by mass, the content of silicon is 100 ppm by mass or less, the total content of elements other than aluminum and magnesium is 500 ppm by mass or less,
the prototype aluminum mold contains magnesium silicide particles, and
the number of magnesium silicide particles having an equivalent diameter of 10 nm to 250 nm on the surface of the stamper is 10/1000 μm² or less.

4. The stamper used in the manufacturing of articles having a fine irregular surface structure on the surface thereof according to claim 3, wherein the prototype aluminum mold the majority of the magnesium silicide particles have an equivalent diameter of 10 nm to 250 nm.

* * * * *